United States Patent
Imai et al.

(10) Patent No.: US 11,906,016 B2
(45) Date of Patent: Feb. 20, 2024

(54) V-RIBBED BELT AND APPLICATION THEREOF

(71) Applicant: Mitsuboshi Belting Ltd., Kobe (JP)

(72) Inventors: Hiroki Imai, Hyogo (JP); Yuji Maruyama, Hyogo (JP); Arata Hasegawa, Hyogo (JP)

(73) Assignee: Mitsuboshi Belting Ltd., Kobe (JP)

( * ) Notice: Subject to any disclaimer, the term of this patent is extended or adjusted under 35 U.S.C. 154(b) by 635 days.

(21) Appl. No.: 17/050,995

(22) PCT Filed: Apr. 25, 2019

(86) PCT No.: PCT/JP2019/017811
§ 371 (c)(1),
(2) Date: Oct. 27, 2020

(87) PCT Pub. No.: WO2019/208740
PCT Pub. Date: Oct. 31, 2019

(65) Prior Publication Data
US 2021/0231192 A1 Jul. 29, 2021

(30) Foreign Application Priority Data

Apr. 27, 2018 (JP) .................... 2018-087204
Apr. 18, 2019 (JP) .................... 2019-079580

(51) Int. Cl.
*F16G 5/20* (2006.01)
*F16G 5/06* (2006.01)
(Continued)

(52) U.S. Cl.
CPC ............... *F16G 5/20* (2013.01); *C08L 23/16* (2013.01); *F16G 5/06* (2013.01); *F16H 7/02* (2013.01); *C08L 2205/03* (2013.01)

(58) Field of Classification Search
CPC .................................. F16G 5/06; F16H 7/02
See application file for complete search history.

(56) References Cited

U.S. PATENT DOCUMENTS

| 5,026,327 A | 6/1991 | White, Jr. et al. |
| 5,674,143 A * | 10/1997 | Kumazaki ................. F16G 5/20 |
| | | 474/263 |

(Continued)

FOREIGN PATENT DOCUMENTS

| CN | 101122098 A | 2/2008 |
| CN | 205859043 U | 1/2017 |

(Continued)

OTHER PUBLICATIONS

Dec. 23, 2021—(EP) Extended Search Report—App No. 19792634.8.

(Continued)

*Primary Examiner* — Michael R Mansen
*Assistant Examiner* — Mark K Buse
(74) *Attorney, Agent, or Firm* — Banner & Witcoff, Ltd.

(57) ABSTRACT

In a V-ribbed belt provided with a compressed rubber layer having V-ribbed portions extending parallel to one another in a belt longitudinal direction, and having a friction transmission surface at least a portion of which is capable of coming into contact with a V-ribbed groove portion of a pulley, the friction transmission surface of the compressed rubber layer is formed from a rubber composition vulcanizate including a rubber component and a sound generation resistance improving agent. A difference between a radius of curvature of a rib distal end portion of the pulley and a radius of curvature of a rib bottom portion of the belt is adjusted to be −0.08-0.08 mm. The radius of curvature of the rib bottom portion may be approximately 0.1-0.5 mm. The radius of curvature difference may be −0.05-0.05 mm. The pulley may include a pulley having an outer diameter at most equal to 65 mm.

12 Claims, 4 Drawing Sheets

(51) Int. Cl.
*F16H 7/02* (2006.01)
*C08L 23/16* (2006.01)

(56) References Cited

U.S. PATENT DOCUMENTS

| | | | | |
|---|---|---|---|---|
| 5,803,855 | A * | 9/1998 | Russell | F16G 5/20 |
| | | | | 474/252 |
| 2004/0214676 | A1* | 10/2004 | Shiriike | F16G 5/20 |
| | | | | 474/263 |
| 2007/0082777 | A1* | 4/2007 | Nishida | F16G 5/20 |
| | | | | 474/237 |
| 2008/0067007 | A1 | 3/2008 | Ach | |
| 2008/0067008 | A1 | 3/2008 | Ach | |
| 2008/0067009 | A1 | 3/2008 | Ach | |
| 2008/0067010 | A1 | 3/2008 | Ach | |
| 2008/0073156 | A1 | 3/2008 | Ach | |
| 2008/0116014 | A1 | 5/2008 | Ach | |
| 2008/0135343 | A1 | 6/2008 | Ach | |
| 2016/0053851 | A1* | 2/2016 | Kojima | F16G 5/08 |
| | | | | 474/265 |
| 2017/0009847 | A1* | 1/2017 | Mitsutomi | D04B 21/20 |
| 2017/0314641 | A1* | 11/2017 | Kamba | F16G 1/28 |
| 2019/0219134 | A1 | 7/2019 | Kunihiro et al. | |

FOREIGN PATENT DOCUMENTS

| | | |
|---|---|---|
| DE | 3430100 A1 | 2/1986 |
| JP | H04-503557 | 6/1992 |
| JP | 2003-074650 A | 3/2003 |
| JP | 2003-148593 A | 5/2003 |
| JP | 2003-172414 A | 6/2003 |
| JP | 2011-252548 A | 12/2011 |
| JP | 2018-035940 A | 3/2018 |
| WO | 90/10164 A1 | 9/1990 |

OTHER PUBLICATIONS

Dec. 22, 2022—(EP) Office Action—App No. 19792634.8.
Aug. 3, 2021 = (CN) Notification of First Office Action—App 201980027852.0, Eng Tran.
Jul. 2, 2019—International Search Report—Intl App PCT/JP2019/017811.

* cited by examiner

V-RIBBED BELT AND APPLICATION THEREOF

CROSS REFERENCE TO RELATED APPLICATIONS

This is a U.S. National Phase Application under 35 U.S.C. § 371 of International Application No. PCT/JP201/017811, filed Apr. 25, 2019, which claims priority to Japanese Application Nos. 2018-087204, filed Apr. 27, 2018 and 2019-079580, filed Apr. 18, 2019, which was published Under PCT Article 21(2), the entire contents of which are incorporated herein by reference.

TECHNICAL FIELD

The present invention relates to a V-ribbed belt used for driving an automobile engine auxiliary machine or the like, and particularly relates to a V-ribbed belt and an application thereof, which is capable of improving fuel economy (i.e., reducing torque loss) while stabilizing a friction state of a frictional power transmission face to maintain noise suppression (i.e., silence).

BACKGROUND ART

In recent years, both fuel economy (i.e., reducing torque loss) and noise suppression (i.e., silence) have been required in an internal combustion engine (engine or the like) of an automobile or the like.

In general, an auxiliary machine such as an alternator, a water pump, a power steering pump, and an air conditioner is attached to an internal combustion engine of an automobile or the like. These auxiliary machines are mechanically driven by a crank shaft of an engine through a power transmission mechanism in which a transmission belt is suspended. For example, in an auxiliary machine driving system of an automobile engine, energy (power) generated by an internal combustion engine (main engine) of the engine is transmitted from a crank shaft (crank pulley) as a driving shaft to a driven shaft (driven pulley) of each auxiliary machine through frictional power transmission via a V-ribbed belt.

When the power is transmitted in this manner, energy loss occurs. The energy loss is referred to as friction loss in the field of engines, and examples of the energy loss include internal loss due to self-heating of a rubber composition forming a belt, and bending loss due to bending deformation of the belt. A "torque loss" value, which is calculated by a difference between a driving torque value of a crank shaft and a driven torque value of a driven shaft (auxiliary machine), is generally used as an index of such energy loss, so that the terms "friction loss" and "torque loss" are used synonymously.

Therefore, the reduction in the friction loss is effective for the improvement in fuel consumption of such an engine, and it is desired to reduce torque loss (a difference between driving torque on the crank shaft and driven torque on the driven shaft (auxiliary machine)) in a power transmission mechanism.

Specifically, as described above, a V-ribbed belt is often used as a transmission belt in an auxiliary machine driving system of an engine, and a series of movements (bending deformation) of the bending (bending or distortion)/the release (or stretching) of the belt before and after winding around the pulley are repeated during the running of the belt. Specifically, since the belt wound around the pulley bends around a cord, the belt is distorted in a state where bending stress due to bending deformation is generated on an outer peripheral side of the cord, and compressive stress due to compressive deformation is generated on an inner peripheral side of the cord. The distortion is released as the belt moves away from the pulleys with the running During the running of the belt, the distorted state (bending shape) and the released state (plane shape) are repeated, and thus internal loss (or self-heating) increases and bending loss occurs. The bending loss is a main cause of the torque loss.

In an auxiliary machine driving system of an automobile engine or the like, a crank pulley having the largest outer diameter and a plurality of driven pulleys may often be generally driven in a layout in which one V-ribbed belt is wound (e.g., a more complex layout whose pulley number is larger than those of layouts in FIG. 6 and FIG. 7). The movement of bending/release is repeated each time the belt passes through each pulley. Accordingly, the frequency of the movement increases in accordance with the number of pulleys, and as a result, large torque loss is likely to occur. Further, the bending amount (deformation amount or distortion) of the belt wound on pulleys is large in a portion having a small pulley diameter (a small-diameter pulley, particularly a pulley having an outer diameter of 65 mm or smaller), such as an alternator (ALT) serving as a power generator, among pulleys. Thus, torque loss associated with greater bending loss occurs. The portion where great torque loss occurs has great influence on friction loss of an engine. Accordingly, it is a major problem to further reduce the torque loss.

On the other hand, as for the noise suppression in an auxiliary machine driving system of an automobile engine or the like, it is a problem to reduce a friction coefficient of a belt surface (i.e., pulley engagement surface) touching a pulley to improve noise easily generated when misalignment (imperfect alignment) occurs in the pulley or noise caused by a stick-slip phenomenon.

The stick-slip phenomenon means self-excited vibration generated between frictional surfaces due to microscopic adhesion or repeated slip of the frictional surfaces to each other. The stick-slip phenomenon is a phenomenon which occurs in a case where the friction coefficient decreases with increase of the slip velocity or in a case where discontinuous reduction of friction occurs when the friction changes from static friction to dynamic friction. Also in a V-ribbed belt, when the friction coefficient between a pulley and a transmission face rubbing thereon is high (particularly adhesiveness is high), a stick-slip phenomenon (i.e., vibration) in which sticking and slip are repeated occurs between the frictional surfaces of the belt and the pulley. As a result, abnormal noise (i.e., squeal noise) occurs in a stage changing from the sticking to the slip.

Further, stick-slip noise generated during running when wetted is also a problem. In detail, when wettability of a frictional power transmission face is so low that the (belt-to-pulley) state of water entering between a belt and a pulley is not uniform, the friction coefficient is high in a place the water has not entered (i.e., dry state) while the friction coefficient extremely decreases locally in a place the water has entered (i.e., wet state). As a result, the frictional state becomes unstable to generate stick-slip noise.

For such a stick-slip phenomenon, a method has been known in which an additive for improving the noise suppression (noise suppression improver, such as an ultra-high molecular weight polyethylene powder, an inorganic powder, a surfactant, and a plasticizer) is blended in a compression rubber layer forming a frictional power transmission face, thereby reducing a friction coefficient of the frictional power transmission face and improving the affinity of frictional power transmission face for water so as to prevent occurrence of abnormal noise.

However, when such a noise suppression improver is used, there are drawbacks that internal loss (or loss tan δ) is often increased and the torque loss increases because the behavior of the noise suppression improver in the rubber is unstable.

That is, in the blending design of the rubber composition forming the V-ribbed belt, the noise suppression (i.e., silence) and the fuel economy (i.e., torque loss reduction) are conflicting characteristics, and it is difficult to make these characteristics compatible only by the blending design. Therefore, in applications of an engine where reduction of the torque loss is important, the addition of such a noise suppression improver should be avoided. Therefore, a method of improving noise suppression and reducing torque loss from another viewpoint of a shape of a belt other than the blending design, for example, shapes such as the curvature radius of a rib bottom portion (or rib groove bottom portion) and the curvature radius of a rib top end, has been studied.

For example, as a belt power-transmission apparatus having excellent noise suppression, which confines noise regardless of material conditions and the like, JP-A-2003-74650 (Patent Literature 1) discloses a belt power-transmission apparatus characterized in that the belt power-transmission apparatus for transmitting power includes a V-ribbed belt having a plurality of rib portions in the circumferential direction of the belt, which is wound around two or more V-ribbed pulleys, in which a rib top end of the V-ribbed pulley is engaged with a rib groove bottom portion of the V-ribbed belt in a press-contact state. Patent Literature 1 states that a curvature radius of a rib top end of a pulley is set to be ½ or less of a curvature radius R of a rib groove bottom portion of a belt, and in Examples, a noise suppression effect is confirmed by using a belt power-transmission apparatus in which a belt whose rib groove bottom portion has a curvature radius of 0.24 mm is engaged with a pulley whose rib top end has a curvature radius of 0.12 mm in a press-contact state.

In such a belt power-transmission apparatus, a certain degree of noise suppression effect is achieved, but sticking wear noise cannot be effectively prevented because the rib groove bottom portion (or the rib bottom portion) of the belt is likely to be worn and damaged. Further, Patent Literature 1 does not describe any about reduction of torque loss.

As a bearing for preventing torque loss caused by frictional resistance associated with biting of a V-ribbed belt into a pulley, JP-A-2011-252548 (Patent Literature 2) discloses a bearing characterized in that the bearing is a bearing with a resin pulley including a rolling bearing and a pulley (2) integrally formed with an outer ring (1) of the bearing, in which a biting restricting part (6, 8) for preventing a rib (4) of the pulley (2) from being bit by passing a predetermined position is provided in a V-groove (5) of a V-ribbed belt (3) hanging on the pulley (2), and a contact avoidance part (9, 10) is provided on a top end position on the top end side of a predetermined position of the rib (4) such that the V-ribbed belt (3) does not contact the pulley (2). As the contact avoidance unit, JP-A-2011-252548 describes a second rounding portion (10) formed by rotating an arc about a pulley shaft from the top end position of the pulley (2) to a top end portion of the rib (4), the arc having a curvature radius (e.g., the curvature radius is 0.5 mm or larger) that is larger than that of an arc formed in the groove bottom of the V-groove (5) of belt (3). Patent Literature 2 states that when the curvature radius of the second rounding portion (10) is increased, the contact between the belt and the pulley can be avoided, and thereby an area where surface pressure occurs can be narrowed, and torque loss caused by surface pressure can be minimized.

However, in Patent Literature 2, not only any about the improvement of the noise suppression is not described, but also it is expected that the power transmission performance is reduced and the slip is likely to occur and the noise suppression is low since the contact area between the belt and the pulley is narrowed by the contact avoidance part. In addition, Patent Literature 2 states that the torque loss caused by heat generation due to the frictional resistance is prevented in a pulley that does not require a torque transmission function, such as an idler pulley and a tension pulley. However, the torque loss caused by the frictional resistance is almost negligible as compared with torque loss caused by the bending deformation of the pulley for torque transmission. Therefore, even when the pulley and the belt of Patent Literature 2 are used, it is not possible to sufficiently reduce torque loss in an auxiliary machine driving system of an engine or the like, and it is not possible to achieve both noise suppression and fuel economy.

JP-T-4-503557 (Patent Literature 3, the term "JP-T" as used herein means a published Japanese translation of a PCT patent application) discloses an assembly characterized in that the assembly includes an endless power transmission belt structure (20) including a plurality of protrusions (38) and grooves (39) extending longitudinally in the same shape, and a rotatable pulley (41) including protrusions (42) and grooves (43) for sequentially meshing with the grooves (39) and the protrusions (38) of the belt structure (20), in which both side edges (44) of each protrusion (38) of the belt structure (20) have an included angle (A) of approximately 60° in a relaxed state, a thickness (T) of the belt structure (20) is substantially the same as a thickness of a belt structure in the related art, which has a similar structure with the included angle of approximately 40°, and a distance (P) between center lines (CL) of two grooves (39) on both sides of the protrusion (38) of the belt structure (20) is larger than a distance in the belt structure having the similar structure. Patent Literature 3 states that the protrusion (42) and the groove (43) of the pulley (41) have substantially the same dimensions as the protrusion (38) and the groove (39) of the belt structure (20), and specifically states that an apex (45) of each groove (39) of the belt structure (20) is defined by a curvature radius of approximately 0.048 cm, and an apex (49) of each protrusion (42) of the pulley (41) is defined by a curvature radius of approximately 0.076 cm. In addition, Patent Literature 3 states that a rib (38) having a high rigidity can be formed, and the operating noise becomes less by maintaining the basic dimension of the common belt structure including ribs with an included angle of 40°, increasing the distance (P), and increasing the curvature radius for defining an apex of the groove (39).

However, Patent Literature 3 does not describe any about reduction of torque loss.

As a V-ribbed belt capable of achieving both noise suppression and fuel economy, JP-A-2018-35940 (Patent Literature 4) discloses a V-ribbed belt including a plurality of V-rib portions extending in a longitudinal direction of the belt and a compression rubber layer that includes a frictional power transmission face at least a part of which can come into contact with a V-rib groove portion, in which the frictional power transmission face of the compression rubber layer is formed from a vulcanizate of a rubber composition containing a rubber component and a noise suppression improver, and a V-rib angle of the V-rib portion is larger than a V-rib groove angle of the pulley by 5° to 9°.

However, Patent Literature 4 does not describe any about a relationship between a curvature radius of a rib bottom portion (or rib groove bottom portion) of a belt or a curvature radius of a rib top end of a pulley and the noise suppression or the fuel economy.

CITATION LIST

Patent Literature

Patent Literature 1: JP-A-2003-74650 (claims, paragraphs [0010] to [0031], Example)
Patent Literature 2: JP-A-2011-252548 (claims 1, and 4 to 6, paragraphs [0001], [0008], [0018] to [0023], and [0047])
Patent Literature 3: JP-T-4-503557 (claims 1, and 4 to 6, lines 4 to 22 on upper left column of page 6, lines 5 to 14 on lower left column of page 6)
Patent Literature 4: JP-A-2018-35940 (claim 1, paragraph [0027])

SUMMARY OF INVENTION

Technical Problem

An object of the present invention is to provide a V-ribbed belt capable of achieving both noise suppression and fuel economy, a belt power-transmission apparatus including the V-ribbed belt, and a method for reducing torque loss of the belt power-transmission apparatus by using the V-ribbed belt.

Another object of the present invention is to provide a V-ribbed belt that maintains noise suppression relative to stick-slip noise and sticking wear noise even when a noise suppression improver is blended in a rubber forming a frictional power transmission face, and can reduce torque loss (particularly, bending loss), a belt power-transmission apparatus including the V-ribbed belt, and a method for reducing torque loss of the belt power-transmission apparatus by using the V-ribbed belt.

Still another object of the present invention is to provide a V-ribbed belt capable of reducing torque loss in pulleys for power transmission (or torque transmission), particularly pulleys including a small-diameter pulley, such as an alternator serving as a power generator, a belt power-transmission apparatus including the V-ribbed belt, and a method for reducing torque loss of the belt power-transmission apparatus by using the V-ribbed belt.

Solution to Problem

As a result of intensive studies for solving the above problems, the present inventors have found that, in a V-ribbed belt including a compression rubber layer containing a noise suppression improver, a difference (Rp−Rb) between a curvature radius Rp of a rib top end of a pulley and a curvature radius Rb of a rib bottom portion of the V-ribbed belt is adjusted to be within a predetermined range, to achieve both noise suppression and fuel economy, and have completed the present invention.

Namely, the V-ribbed belt according to the present invention includes a plurality of V-rib portions extending along a longitudinal direction of the belt and in parallel with one another, and a compression rubber layer including a frictional power transmission face at least a part of which can come into contact with a V-rib groove portion of a pulley, in which the frictional power transmission face of the compression rubber layer is formed from a vulcanizate of a rubber composition containing a rubber component and a noise suppression improver, and a difference (Rp−Rb) between a curvature radius Rp of a rib top end of the pulley and a curvature radius Rb of a rib bottom portion of the V-ribbed belt is −0.08 to 0.08 mm.

The curvature radius Rb of the rib bottom portion of the V-ribbed belt may be about 0.1 to 0.5 mm (e.g., 0.15 to 0.45 mm). The difference (Rp−Rb) of the above curvature radii may be about −0.05 to 0.05 mm. The pulley may include a pulley having an outer diameter of 65 mm or smaller. The V-rib portion of the V-ribbed belt may have a V-rib angle α of about 30° to 60°, and a difference α−β between the V-rib angle α and a V-rib groove angle β of the pulley may be about −1° to 1°.

The noise suppression improver may contain at least one kind (particularly a polyethylene glycol nonionic surfactant and/or an ether ester plasticizer) selected from the group consisting of a surfactant, a plasticizer having a larger solubility parameter than the rubber component, inorganic particles, and polyethylene resin particles. A proportion of the polyethylene glycol nonionic surfactant may be about 2 to 20 parts by mass relative to 100 parts by mass of the rubber component. A proportion of the ether ester plasticizer may be 5 to 15 parts by mass relative to 100 parts by mass of the rubber component. The rubber component may contain an ethylene-α-olefin elastomer.

The present invention includes a belt power-transmission apparatus including the V-ribbed belt and a pulley having a V-rib groove portion capable of fitting to the V-rib portion of the V-ribbed belt, in which the difference (Rp−Rb) between the curvature radius Rp of a rib top end of the pulley and the curvature radius Rb of a rib bottom portion of the V-ribbed belt is −0.08 to 0.08 mm (e.g., −0.05 to 0.05 mm). The pulley may include a pulley having an outer diameter of 65 mm or smaller.

In addition, the present invention also includes a method for reducing torque loss of the belt power-transmission apparatus by hanging the V-ribbed belt on a pulley including the pulley having an outer diameter of 65 mm or smaller.

In the present description and claims, a numerical range "XX to YY" means that the numerical range includes the numerical value "XX" and the numerical value "YY", that is, the numerical range is equal to the numerical value "XX" or more and the numerical value "YY" or less.

Advantageous Effects of Invention

In the present invention, in a V-ribbed belt including a compression rubber layer containing a noise suppression improver, a difference (Rp−Rb) between a curvature radius Rp of a rib top end of a pulley and a curvature radius Rb of a rib bottom portion of the V-ribbed belt is adjusted to be within a predetermined range, so that both noise suppression and fuel economy can be achieved. Specifically, noise suppression relative to stick-slip noise and sticking wear noise can be maintained even when a noise suppression improver as a foreign substance is blended in a rubber forming a frictional power transmission face, and torque loss (particularly, bending loss) can be reduced. In particular, torque loss can be reduced even in a small-diameter pulley such as an alternator serving as a power generator.

DESCRIPTION OF EMBODIMENTS

[Structure of V-Ribbed Belt]

Figure 1:
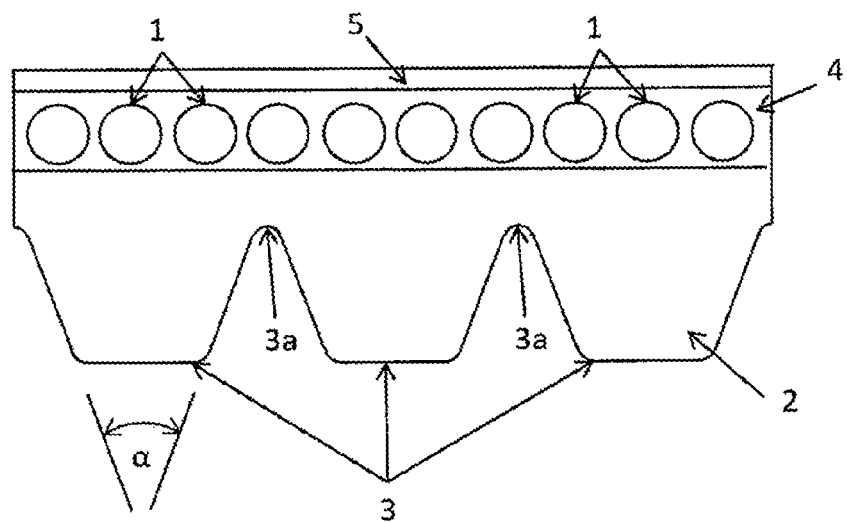
FIG. 1 is a schematic sectional view illustrating an example of a V-ribbed belt of the present invention.

A configuration of a V-ribbed belt according to the present invention is not limited particularly, as long as the V-ribbed belt includes a plurality of V-rib portions extending along a longitudinal direction of the belt and in parallel with one another, and a difference (Rp−Rb) between a curvature radius Rp of a rib top end of a pulley and a curvature radius Rb of a rib bottom portion of the V-ribbed belt is about −0.08 to 0.08 mm. An example of the configuration is illustrated in FIG. 1. FIG. 1 is a schematic sectional view illustrating an example of a V-ribbed belt according to the present invention. The V-ribbed belt illustrated in FIG. 1 has a configuration in which a compression rubber layer 2, an adhesive layer 4 including a tension member 1 embedded therein in the longitudinal direction of the belt, and a tension layer 5 composed of a cover canvas (e.g., woven fabric, knit, non-woven fabric, etc.) are stacked in this order from a belt bottom surface (i.e., inner surface) toward a belt top surface (i.e., back face). A plurality of sectionally V-shaped grooves extending in the longitudinal direction of the belt are formed in the compression rubber layer 2. A plurality (three in the example illustrated in FIG. 1) of V-rib portions 3 each having a V-shape in section (i.e., inverted trapezoid shape) are formed between the grooves. Two slopes (i.e., surfaces) of each V-rib portion 3 form a frictional power transmission face, which comes into contact with a pulley to transmit power (i.e., frictional power transmission).

The V-ribbed belt according to the present invention is not limited to the aforementioned configuration. The V-ribbed belt may include a compression rubber layer having a transmission face at least a part of which can come into contact with a V-rib groove portion (V-groove portion) of pulleys. Typically the V-ribbed belt may include a tension layer, a compression rubber layer, and a tension member embedded therebetween along the longitudinal direction of the belt. In the V-ribbed belt according to the present invention, the tension layer 5 may be, for example, formed from a rubber composition, and the tension member 1 may be embedded between the tension layer 5 and the compression rubber layer 2 without providing the adhesive layer 4. Further, the V-ribbed belt according to the present invention may have a configuration in which the adhesive layer 4 is provided in either the compression rubber layer 2 or the tension layer 5, and the tension member 1 is embedded between the adhesive layer 4 (provided on compression rubber layer 2 side) and the tension layer 5 or between the adhesive layer 4 (provided on extension layer 5 side) and the compression rubber layer 2.

At least the compression rubber layer may be formed from a vulcanizate of the rubber composition, which is described in detail below. The tension layer and the adhesive layer do not have to be formed from the same vulcanizate of the rubber composition as the compression rubber layer, but may be formed from a common vulcanizate of a rubber composition used as a tension layer and an adhesive layer. The vulcanizate of the rubber composition forming the tension layer and the adhesive layer do not have to contain any noise suppression improver.

Figure 2:
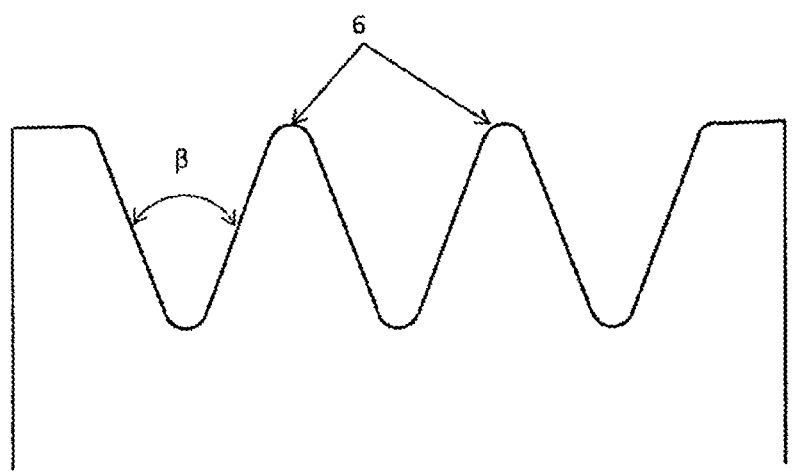
FIG. 2 is a schematic sectional view illustrating an example of a pulley for suspending (or hanging) the V-ribbed belt of the present invention.
Figure 3:
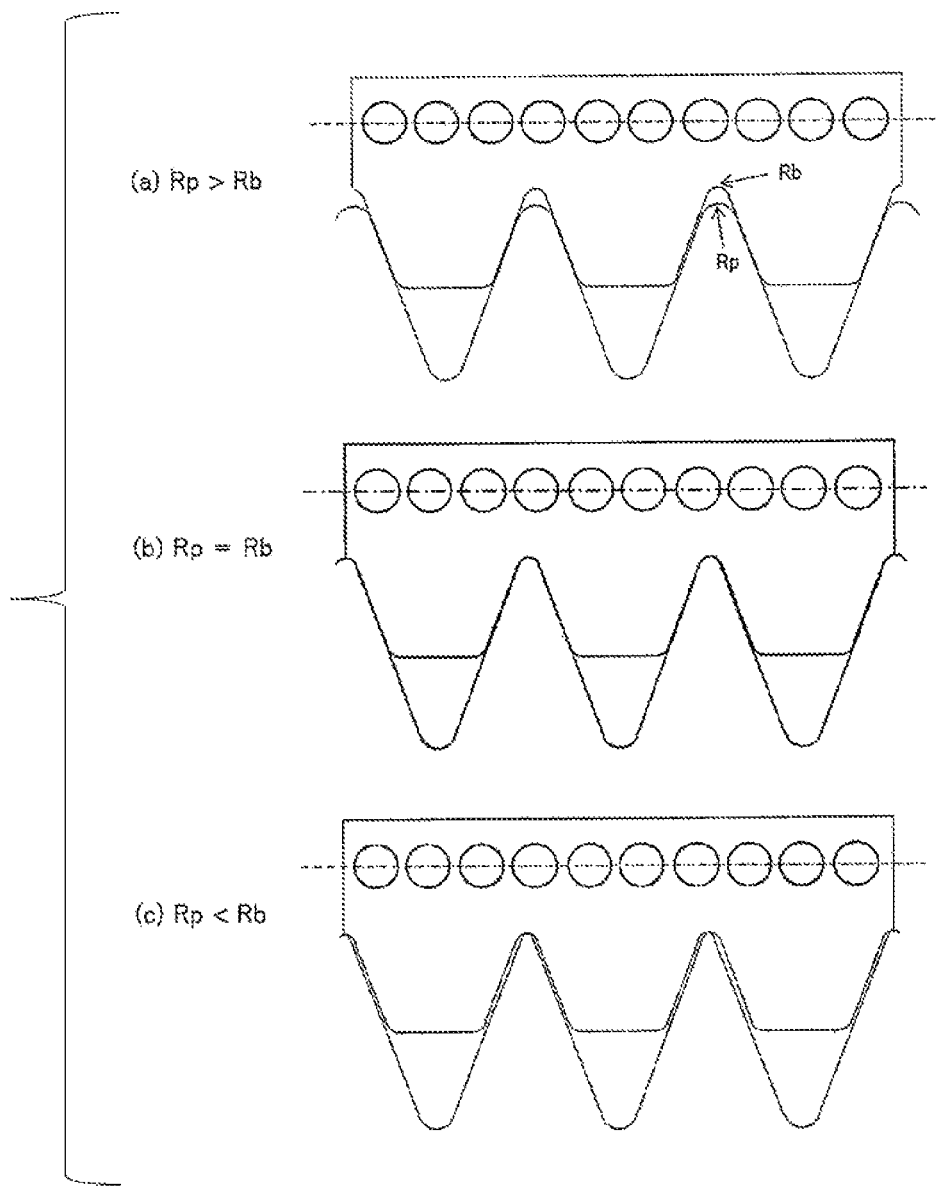
FIG. 3 is a schematic sectional view for illustrating a difference in a fitting state between a belt and a pulley based on relationships between a curvature radius Rp of a rib top end of a pulley and a curvature radius Rb of a rib bottom portion of the V-ribbed belt of the present invention [(a) Rp>Rb, (b) Rp=Rb, (c) Rp<Rb].

In the V-ribbed belt according to the present invention, a difference (Rp−Rb) between a curvature radius Rp of a rib top end 6 of a pulley (or V-ribbed pulley) illustrated in FIG. 2 and a curvature radius Rb of a rib bottom portion (rib groove bottom portion) 3a of the V-ribbed belt illustrated in FIG. 1 is adjusted to be within a predetermined range. Specifically, FIG. 3 is a schematic sectional view for illustrating a relationship between Rp and Rb, and the fitting (or engagement) state of a belt and a pulley. FIG. 3 illustrates a configuration in which a V-rib angle α of the V-ribbed belt illustrated in FIG. 1 is equal to a V-rib groove angle β of the pulley illustrated in FIG. 2 (α−β=0°).

FIG. 3 illustrates fitting states between the belt and the pulley respectively in the case of (a) Rp>Rb (or Rp−Rb>0), the case of (b) Rp=Rb (or Rp−Rb=0), and the case of Rp<Rb (or Rp−Rb<0). In the present invention, both noise suppression and fuel economy can be achieved in the case of (b) Rp−Rb=0 or by forming a configuration in which the difference Rp−Rb is reduced even in the case of (a) or (c).

More specifically, friction loss (torque loss of a belt power-transmission apparatus) can be reduced without degrading other characteristics such as noise suppression (silence) by adjusting the above difference Rp−Rb to be, for example, −0.08 to 0.08 mm (e.g., −0.075 to 0.075 mm), preferably −0.07 to 0.07 mm (e.g., −0.06 to 0.06 mm), more preferably −0.05 to 0.05 mm (e.g., −0.04 to 0.04 mm), still more preferably −0.03 to 0.03 mm (e.g., −0.02 to 0.02 mm), yet still more preferably −0.01 to 0.01 mm (e.g., −0.005 to 0.005 mm), and particularly preferably −0.003 to 0.003 mm (particularly, substantially 0 mm). When the difference Rp−Rb is too large on the positive side, torque loss cannot be reduced, or stick-slip abnormal noise (particularly, stick-slip noise in a misalignment state) may occur easily. When the difference Rp−Rb is too small on the negative side, the torque loss cannot be reduced, or sticking wear is likely to occur and noise suppression may decrease.

The reason for exhibiting such behavior is presumed as follows. First, when the difference Rp−Rb is large on the positive side, a space (gap) formed between the rib bottom portion of the belt and the rib top end of the pulley increases in the configuration of FIG. 3(a). Since tension is applied to the belt in the running state, the space becomes a deformation area of the belt, and the belt wound around the pulley deforms in the depth direction of the groove of the pulley (or toward the center of the pulley) and falls into the groove of the pulley. That is, as the space becomes large, the deformation area of the belt increases, and the bending amount (or deformation amount) of the belt at the time of passing through the pulley increases. As a result, the bending loss increases, and the torque loss becomes large. Further, as the space becomes large, the contact area between the belt and the pulley is reduced. Accordingly, the power transmission performance is reduced, and the stick-slip abnormal noise (particularly, stick-slip abnormal noise in the misalignment state) is likely to occur.

On the contrary, when the difference Rp−Rb is large on the negative side, a space (gap) between a rib taper face of the belt and a rib taper face of the pulley becomes large in the configuration of FIG. 3(c). Also in such a configuration, the space becomes a deformation area of the belt, and the belt deforms, due to the tension, in the depth direction of the groove of the pulley (or a groove direction of a pulley) and falls into the groove of the pulley. Thus, the bending amount of the belt increases, the bending loss increases, and the torque loss becomes large, which is similar to the case where the difference Rp−Rb is large on the positive side. When the difference Rp−Rb is large on the negative side, the rib bottom portion of the belt comes into contact with the rib top end of the pulley having a smaller curvature radius, and the belt runs in a state of falling in a groove direction of the pulley due to the tension. As a result, the rib bottom portion of the belt is scraped due to wear, and sticking wear noise is likely to occur.

Since a space is generally provided between a belt and a pulley in a method according to the related art, it is presumed that fuel economy and noise suppression are hardly improved from the above reasons. However, in the present invention, a difference between a curvature radius of a rib bottom portion of a belt and a curvature radius of a rib top end of a pulley is decreased (particularly, a shape of the rib bottom portion of the belt and a shape of the rib top end of the pulley, and shapes of taper surfaces of ribs of the belt and the pulley are made almost the same), so that a space formed between the belt and the pulley is reduced (or disappears), and the belt is prevented from deforming (or falling) in the groove direction of the pulley due to the tension. Accordingly, bending loss or torque loss can be effectively reduced.

Specifically, the curvature radius Rb of the rib bottom portion of the V-ribbed belt is selected from a range of about 0.1 to 0.5 mm (for example, 0.15 to 0.45 mm), and may be, for example, 0.2 to 0.43 mm (for example, 0.25 to 0.42 mm), preferably 0.28 to 0.41 mm (for example, 0.3 to 0.4 mm), and more preferably 0.32 to 0.38 mm (for example, 0.33 to 0.37 mm) or so. The curvature radius Rb may be generally 0.26 to 0.48 mm (for example, 0.27 to 0.44 mm), and preferably 0.29 to 0.47 mm (for example, 0.31 to 0.46 mm) or so. In the V-ribbed belt according to the present invention, the absolute value of the difference Rp−Rb is decreased (Rp−Rb is nearly equal to 0) [further, the absolute value of an angle difference α−β described below is decreased (α−β is nearly equal to 0)], and is adjusted to be within a predetermined range. Therefore, when the curvature radius of the curvature radius Rb of the rib bottom portion is too small, torque loss may not be sufficiently reduced, and sticking wear may be likely to occur. On the contrary, when the absolute value of the difference Rp−Rb is too large, a thickness of the rib portion is reduced, which may cause the transmission performance to deteriorate.

In the V-ribbed belt according to the present invention, the V-rib angle α of the V-ribbed belt shown in FIG. 1 and the V-rib groove angle β of the pulley shown in FIG. 2 are often generally approximately equal (α−β is nearly equal to 0°). Specifically, the angle difference α−β may be, for example, −3° to 3° (for example, −2° to 2°), preferably −1° to 1° (for example, −0.5° to 0.5°), and more preferably −0.1° to 0.1° (particularly, 0°).

Specifically, the V-rib angle α of the V-ribbed belt may be selected from the range of about 30° to 60°, and may be, for example, 33° to 50°, preferably 35° to 45°, and more preferably 38° to 42° or so.

In the present description and the scope of claims, the curvature radii Rb and Rp, or the angles α and β can be measured in the following manner A longitudinal section of the belt or the pulley in a relaxed state (a state where the belt is not suspended) is observed with a projector or a microscope, and the curvature radii Rb and Rp, or the angles α and β are read and obtained from a captured image. Among a plurality of pulleys on which the V-ribbed belt according to the present invention is wound (or which can contact the V-ribbed belt), the curvature radius Rp (and the V-rib groove angle (3) of at least one pulley may be within a range that satisfies the difference Rp−Rb (and the angle difference α−β), and Rp (and β) of the plurality of pulleys may be the same or different from one other. However, it is preferable that Rp (and β) of all the pulleys are within a range that satisfies the difference Rp−Rb (and the angle difference α−β). When the pulleys includes a small-diameter pulley described below, it is preferable that Rp (and (3) of at least the small-diameter pulley are within a range that satisfies the difference Rp−Rb (and the angle difference α−β), from the viewpoint of further reducing torque loss.

The V-ribbed belt according to the present invention is effective for a pulley for torque transmission and is particularly effective for a small-diameter pulley which causes the repeated movement of distortion/release due to bending to be severe and increases the bending amount (deformation amount) of a belt wound on the pulley due to a decrease in a diameter. This is because the torque loss is largest at the small-diameter pulley having the highest surface pressure with the pulley and the torque loss at the small-diameter pulley has great influence on the friction loss of the engine. Therefore, the V-ribbed belt according to the present invention is preferably hung on a pulley including a small-diameter pulley, and an outer diameter of such a small-diameter pulley may be 65 mm or smaller, for example, 10 to 65 mm, preferably 20 to 62 mm (for example, 30 to 60 mm), and more preferably 40 to 55 mm or so.

The tension member is not limited particularly. Generally, a cord (i.e., twisted cord) which is arrayed at predetermined intervals in a width direction of the belt can be used. High-modulus fibers, for example, synthetic fibers such as polyester fibers (e.g., polyalkylene arylate fibers) and aramid fibers, inorganic fibers such as carbon fibers, or the like are generally used as the cord. Polyester fibers (e.g., polyethylene terephthalate fibers or polyethylene naphthalate fibers) or aramid fibers are preferred. The fibers may include multifilament yarns, for example, multifilament yarns having fineness of about 2,000 to 10,000 denier (particularly, 4,000 to 8,000 denier).

A twisted cord (such as a plied yarn (organzine), a single-twisted yarn, and a Lang's lay yarn) using multifilament yarns may be generally used as the cord. The average wire diameter of the cord (i.e., the fiber diameter of the twisted cord) may be, for example, 0.5 to 3 mm, preferably 0.6 to 2 mm, and more preferably 0.7 to 1.5 mm or so. The cord is embedded in the longitudinal direction of the belt. A single cord or a plurality of cords may be embedded at predetermined pitches in parallel with the longitudinal direction of the belt.

In order to improve adhesion to the rubber component, the cord may be embedded between the tension layer and the compression rubber layer (particularly in the adhesive layer) after various bonding treatments using a resorcin-formalinlatex (RFL) solution, an epoxy compound, an isocyanate compound, or the like are performed on the cord.

Further, the tension layer may include a reinforcing cloth, for example, a cloth material such as woven fabric, wide angle canvas, knit, and non-woven fabric (preferably woven fabric). The aforementioned bonding treatments may be performed on the reinforcing cloth if necessary, so that an adhesive layer may be laminated on a surface of the tension layer.

[Compression Rubber Layer]

The V-ribbed belt according to the present invention is provided with a compression rubber layer including a transmission face at least a part of which can come into contact with a V-rib groove portion of pulleys. In the compression rubber layer, the frictional power transmission face is formed from a vulcanizate of a rubber composition containing a rubber component and a noise suppression improver. For example, the compression rubber layer may be one in which a surface layer portion formed from the aforementioned vulcanizate of the rubber composition is formed in the frictional power transmission face while the other part (i.e., inner layer portion) does not contain the noise suppression improver. However, from the viewpoint of noise suppression (particularly long-term noise suppression), productivity, etc., it is preferable that the whole of the compression rubber layer is formed from the vulcanizate of the rubber composition containing the noise suppression improver.

(Rubber Component)

Examples of the rubber component include well-known rubber components and/or elastomers such as diene rubber [natural rubber, isoprene rubber, butadiene rubber, chloroprene rubber, styrene-butadiene rubber (SBR), acrylonitrile-butadiene rubber (nitrile rubber), hydrogenated nitrile rubber (including a polymer blend of hydrogenated nitrile rubber and unsaturated metal carboxylate), etc.], ethylene-α-olefin elastomer, chlorosulfonated polyethylene rubber, alkylated chlorosulfonated polyethylene rubber, epichlorohydrin rubber, acrylic rubber, silicone rubber, urethane rubber, fluororubber, and the like. Each of these rubber components may be used alone, or two or more kinds of the rubber components may be used in combination. Among the rubber components, an ethylene-α-olefin elastomer (ethylene-α-olefin rubber such as ethylene-propylene copolymer (EPM), ethylene-propylene-diene copolymer (such as EPDM)) is preferred since it does not contain harmful halogens but has ozone resistance, heat resistance and cold resistance and is also excellent in economy.

(Noise Suppression Improver)

Since at least the frictional power transmission surface of the compression rubber layer includes a noise suppression improver, the friction state between the belt and the pulley can be stabilized, and the noise suppression can be improved. However, since the noise suppression improver is unstable in the behavior in the rubber, the internal loss is likely to increase, and as a result, an increase in torque loss is caused. However, in the present invention, although the compression rubber layer includes a noise suppression improver, torque loss can be effectively reduced, and both noise suppression and fuel economy in a trade-off relationship can be achieved at a high level since the difference Rp−Rb between the curvature radius Rp of the rib top end of the pulley and the curvature radius Rb of the rib bottom portion of the belt is adjusted to be within a predetermined range.

The proportion of the noise suppression improver can be selected from a range of about 1 to 100 parts by mass relative to 100 parts by mass of the rubber component in accordance with the kind of the noise suppression improver, and is, for example, 1 to 40 parts by mass (particularly, 2 to 35 parts by mass) or so. When the proportion of the noise suppression improver is too low, the noise suppression (particularly noise suppression relative to stick-slip abnormal noise) may be lowered. On the contrary, when the proportion is too high, the torque loss may increase.

A common noise suppression improver for stabilizing the belt-to-pulley friction state may be used as the noise suppression improver. From the viewpoint of an excellent effect of improving the noise suppression, a surfactant, a plasticizer, inorganic particles, and polyethylene resin particles are preferred. Each of these noise suppression improvers may be used alone, or two or more kinds of the noise suppression improvers may be used in combination.

(A) Surfactant

The surfactant may be either an ionic surfactant or a nonionic surfactant, and the surfactant may be selected in accordance with the kind of the rubber component. When the rubber component is an ethylene-α-olefin elastomer, the nonionic surfactant is preferred from the viewpoint of improving the noise suppression. A polyethylene glycol nonionic surfactant or a polyhydric alcohol nonionic surfactant is particularly preferred.

The polyethylene glycol nonionic surfactant is a nonionic surfactant in which ethylene oxide is added to a hydrophobic base component having a hydrophobic group, such as higher alcohol, alkyl phenol, higher fatty acid, polyhydric alcohol higher fatty acid ester, higher fatty acid amide, or polypropylene glycol, to impart a hydrophilic group thereto.

Examples of higher alcohols as the hydrophobic base component include $C_{10-30}$ saturated alcohols such as lauryl alcohol, tetradecyl alcohol, cetyl alcohol, octadecyl alcohol and aralkyl alcohol, $C_{10-26}$ unsaturated alcohols such as oleyl alcohol, and the like. Examples of alkyl phenols include $C_{4-16}$ alkyl phenols such as octyl phenol and nonyl phenol, and the like. Each of these higher alcohols may be used alone, or two or more kinds of the higher alcohols may be combined.

Examples of higher fatty acids as the hydrophobic base component include saturated acids [for example, $C_{10-30}$ saturated fatty acids such as myristic acid, palmitic acid, stearic acid, arachic acid, behenic acid, lignoceric acid, cerotic acid, and montanoic acid, preferably $C_{12-28}$ saturated fatty acids, more preferably $C_{14-26}$ saturated fatty acids, and particularly more preferably $C_{16-22}$ saturated fatty acids, etc.; oxycarbonic acids such as hydroxystearic acid; etc.], unsaturated fatty acids [for example, $C_{10-30}$ unsaturated fatty acids such as oleic acid, erucic acid, linolic acid, linolenic acid, and eleostearic acid, etc.], and the like. Each of these higher fatty acids may be used alone, or two or more kinds of the higher fatty acids may be combined.

The polyhydric alcohol higher fatty acid ester is an ester of polyhydric alcohol and a higher fatty acid, and contains an unreacted hydroxyl group. Examples of the polyhydric alcohols include alkanediols ($C_{2-10}$ alkanediols such as ethylene glycol, propylene glycol and butanediol, etc.), alkanetriols (such as glycerin, trimethylolethane, and trimethylolpropane), alkanetetraols (such as pentaerythritol and diglycerine), alkanehexaols (such as dipentaerythritol and sorbitol (or sorbit)), alkaneoctaols (such as sucrose), alkylene oxide adducts thereof (such as $C_{2-4}$ alkylene oxide adducts), and the like. Each of these higher fatty acid esters may be used alone, or two or more kinds of the higher fatty acid esters may be combined.

"Oxyethylene", "ethylene oxide" or "ethylene glycol" is expressed as "EO" below, and "oxypropylene", "propylene oxide" or "propylene glycol" is expressed as "PO" below. Specific examples of the polyethylene glycol nonionic surfactant include $C_{10-26}$ higher alcohol-EO-PO adducts such as poly-EO higher alcohol ethers (such as poly-EO $C_{10-26}$ alkyl ethers such as poly-EO lauryl ether and poly-EO stearyl ether), and poly-EO poly-PO alkyl ethers; alkylphenol-EO adducts such as poly-EO octylphenyl ether, and poly-EO nonylphenyl ether; fatty acid-EO adducts such as poly-EO monolaurate, poly-EO monooleate, and poly-EO monostearate; polyhydric alcohol higher fatty acid ester-EO adducts such as glycerin mono- or di-higher fatty acid ester-EO adducts (such as EO adducts of glycerin mono- or di-$C_{10-26}$ fatty acid esters such as glycerin mono- or di-laurate, glycerin mono- or di-palmitate, glycerin mono- or di-stearate, and glycerin mono- or di-olate), pentaerythritol higher fatty acid-EO adducts (such as pentaerythritol mono- to tri-$C_{10-26}$ fatty acid ester-EO adducts such as pentaerythritol distearate-EO adduct), dipentaerythritol higher fatty acid-EO adducts, sorbitol (or sorbit) higher fatty acid ester-EO adducts, sorbitan fatty acid ester-EO adducts such as poly-EO sorbitan monolaurate, poly-EO sorbitan monostearate, and poly-EO sorbitan tristearate, and sucrose higher fatty acid-EO adducts; higher alkylamine-EO adducts such as poly-EO lauryl amino ether and poly-EO stearyl amino ether; fatty acid amide-EO adducts such as poly-EO coconut oil fatty acid monoethanol amide, poly-EO lauric acid monoethanol amide, poly-EO stearic acid monoethanol amide, and poly-EO oleic acid monoethanol amide; oil or fat-EO adducts such as poly-EO castor oil, and poly-EO hardened castor oil; poly-PO-EO adducts (such as poly-EO-poly-PO block copolymers); and the like. Each of those polyethylene glycol nonionic surfactants may be used alone, or two or more kinds of the polyethylene glycol nonionic surfactants may be combined.

The polyhydric alcohol nonionic surfactant is a nonionic surfactant in which a hydrophobic group of higher fatty acid or the like is combined with the aforementioned polyhydric alcohol (particularly alkanetriol to alkanehexaol such as glycerol, pentaerythritol, sucrose or sorbitol). Examples of the polyhydric alcohol nonionic surfactant include glycerin fatty acid esters such as glycerin monostearate and glycerin monooleate, pentaerythritol fatty acid esters such as pentaerythritol monostearate and pentaerythritol di-tallow acid ester, sorbitan fatty acid esters such as sorbitan monolaurate and sorbitan monostearate, sorbitol fatty acid ethers such as sorbitol monostearate, sucrose fatty acid esters, alkyl ethers of polyhydric alcohols, fatty acid amides of alkanolamines such as coconut oil fatty acid diethanol amide, alkyl polyglycoside, and the like. Each of these polyhydric alcohol nonionic surfactants may be used alone, or two or more kinds of the polyhydric alcohol nonionic surfactants may be combined. These polyhydric alcohol nonionic surfactants may be used in combination with the aforementioned polyethylene glycol nonionic surfactant.

The nonionic surfactants are preferred surfactants. Particularly the polyethylene glycol nonionic surfactant (such as poly-EO $C_{10-26}$ alkyl ethers, alkylphenol-EO adducts, and polyhydric alcohol $C_{10-26}$ fatty acid ester-EO adducts) is preferred.

When the rubber component is an ethylene-α-olefin elastomer, the Hydrophile-Lipophile-Balance (HLB) value of the surfactant is, for example, 8.7 to 17, preferably 9 to 15, and more preferably 9.5 to 14 (particularly 10 to 13.5) or so. The HLB value is a value calculated by a Griffin method in the present description and the scope of claims.

The viscosity (25° C.) of the surfactant is, for example, 10 to 300 MPa·s, and preferably 20 to 200 MPa·s or so.

The proportion of the surfactant (particularly the polyethylene glycol nonionic surfactant) is, for example, 1 to 25 parts by mass, preferably 2 to 20 parts by mass, more preferably 3 to 15 parts by mass (for example, 3.5 to 10 parts by mass), and particularly more preferably 4 to 8 parts by mass (for example, 4.5 to 6 parts by mass) or so, relative to 100 parts by mass of the rubber component. When the proportion of the surfactant is too low, the noise suppression (particularly noise suppression relative to stick-slip abnormal noise in a real vehicle) may be lowered. On the contrary, when the proportion is too high, the torque loss may increase.

(B) Plasticizer

Any plasticizer having a larger solubility parameter (SP value) than the rubber component may be used as the plasticizer. In order to improve the noise suppression, it is preferable that the plasticizer has, for example, a solubility parameter of 8.3 to 10.7 $(cal/cm^3)^{1/2}$, preferably 8.4 to 10.5 $(cal/cm^3)^{1/2}$, and more preferably 8.5 to 10 $(cal/cm^3)^{1/2}$ or so. The aforementioned solubility parameter is effective particularly when the rubber component is an ethylene-α-olefin elastomer.

A common plasticizer having such a solubility parameter can be used as the plasticizer. Examples of such common plasticizers include an aliphatic carboxylic acid plasticizer (such as an adipic acid ester plasticizer and a sebacic acid ester plasticizer), an aromatic carboxylic acid ester plasticizer (such as a phthalic acid ester plasticizer and a trimellitic acid ester plasticizer), an oxycarboxylic acid ester plasticizer, a phosphoric acid ester plasticizer, an ether plasticizer, an ether ester plasticizer, and the like. Each of these plasticizers may be used alone, or two or more kinds of the plasticizers may be used in combination. Among the plasticizers, the ether ester plasticizer is preferred due to its great effect of improving the noise suppression when the rubber component is an ethylene-α-olefin elastomer.

Examples of the ether ester plasticizer include poly-$C_{2-4}$ alkylene glycol di-$C_{2-18}$ fatty acid esters such as poly-EO dibutanoic acid ester, poly-EO diisobutanoic acid ester, poly-EO di-2-ethylbutanoic acid ester, poly-EO di-2-ethylhexanoic acid ester, and poly-EO didecanoic acid ester; poly-$C_{2-4}$ alkylene oxide adducts of $C_{2-12}$ aliphatic dicarboxylic acid such as adipic acid poly-EO adduct; $C_{2-12}$ aliphatic dicarboxylic acid di($C_{1-12}$ alkoxy $C_{2-4}$ alkyl) esters such as adipic acid mono- or di-(butoxyethyl) ester, adipic acid di(2-ethylhexyloxyethyl) ester, and adipic acid di(octoxyethyl) ester; and the like. Each of these ether ester plasticizers may be used alone, or two or more kinds of the ether ester plasticizers may be used in combination. Among the ether ester plasticizers, poly-$C_{2-4}$ alkylene glycol di-$C_{4-12}$ fatty acid esters such as poly-EO di-2-ethylhexanoic acid ester are preferred.

The weight average molecular weight of the plasticizer (particularly the ether ester plasticizer) is, for example, 300 to 2,000, preferably 350 to 1,500 (for example, 370 to 1,000), and more preferably 400 to 800 (particularly 450 to 600) or so in terms of polystyrene in gel permeation chromatography (GPC).

The proportion of the plasticizer (particularly the ether ester plasticizer) is, for example, 3 to 20 parts by mass, preferably 4 to 18 parts by mass, and more preferably 5 to 15 parts by mass (particularly 8 to 12 parts by mass) or so, relative to 100 parts by mass of the rubber component. When the proportion of the plasticizer is too low, the noise suppression (particularly noise suppression relative to stick-slip abnormal noise in a misalignment state) may be lowered. On the contrary, when the proportion is too high, the torque loss may increase.

(C) Inorganic Particles

Common inorganic particles can be used as the inorganic particles (i.e., inorganic filler or inorganic powder). Examples of the common inorganic particles include graphite, metal oxides (such as calcium oxide, barium oxide, iron oxide, copper oxide, titanium oxide, or aluminum oxide), metal carbonates (such as magnesium carbonate and calcium carbonate), metal silicate (such as calcium silicate and aluminum silicate), metal carbide (such as silicon carbide and tungsten carbide), metal nitride (such as titanium nitride, aluminum nitride, and boron nitride), metal sulfide (such as molybdenum disulfide), metal sulfate (such as calcium sulfate and barium sulfate), clay (hydrated aluminum silicate: clay composed of clay minerals, such as pyrophyllite, kaolinite, sericite, montmorillonite, bentonite, and smectite), talc (hydrated magnesium silicate: inorganic particles called talcum, soapstone, or steatite, etc.), mica, alumina, silica, zeolite, diatomaceous earth, fired diatomaceous earth, activated clay, and the like. Each of these inorganic particles may be used alone, or two or more kinds of the inorganic particles may be used in combination. Among the inorganic particles, metal carbonates such as calcium carbonate, clay such as montmorillonite, and talc are preferred.

The shape of each inorganic particle is not limited particularly. For example, the shape may be a spherical shape, an ellipsoidal shape, a polyhedral shape (such as a pyramid-like shape, a cubic shape, and a rectangular parallelepiped shape), a flat shape (such as a sheet-like shape and a scaly shape), a rod-like shape, a fibrous shape, an indeterminate shape, or the like. Among these shapes, the flat shape, the indeterminate shape, or the like are generally used.

The average particle size (number average primary particle size) of the inorganic particles is, for example, 0.1 to 100 µm, preferably 1 to 50 µm, and more preferably 1 to 30 µm or so. When the size of the inorganic particles is too small, the noise suppression cannot be improved sufficiently. On the contrary, when the size is too large, the mechanical characteristics of the belt may deteriorate. In the present description and the scope of claims, the average particle size and the aspect ratio can be measured by a method for measuring dimensions based on a scanning electron micrograph taken with a magnification of 50 times, a laser diffraction scattering method, or the like.

The inorganic particles may be either non-porous or porous. The nitrogen adsorption specific surface area calculated by a BET method is, for example, 5,000 to 30,000 $cm^2/g$, and preferably 6,000 to 25,000 $cm^2/g$ or so. When the specific surface area is too small, the particles are so large that the mechanical characteristics of the belt may deteriorate. On the contrary, when the specific surface area is too large, the particles are so small that the noise suppression may not be improved sufficiently.

The apparent density of the inorganic particles is, for example, 0.2 to 0.7 g/ml, and preferably 0.25 to 0.65 g/ml or so. The oil absorbing amount of the inorganic particles is 10 to 40 ml/100 g, and preferably 20 to 38 ml/100 g or so.

The proportion of the inorganic particles is, for example, 10 to 50 parts by mass, preferably 15 to 45 parts by mass (for example, 15 to 35 parts by mass), and more preferably 20 to 40 parts by mass (particularly 30 to 35 parts by mass) or so, relative to 100 parts by mass of the rubber component. When the proportion of the inorganic particles is too low, the noise suppression may be lowered. On the contrary, when the proportion is too high, the torque loss may increase.

(D) Polyethylene Resin Particles

Polyethylene resin forming the polyethylene resin particles may be a polyethylene homopolymer, or may be a polyethylene copolymer. Examples of copolymeric monomers contained in the copolymer include olefins (for example, $\alpha$-$C_{3-8}$ olefins such as propylene, 1-butene, 1-pentene, 1-hexene, 3-methyl-pentene, 4-methyl-pentene, and 1-octene), (meth)acrylic monomers [for example, (meth)acrylic acid $C_{1-6}$ alkyl esters such as methyl (meth)acrylate, and ethyl (meth)acrylate, etc.], unsaturated carboxylic acids (such as maleic anhydride), vinyl esters (such as vinyl acetate and vinyl propionate), dienes (such as butadiene and isoprene), and the like. Each of these copolymeric monomers may be used alone, or two or more kinds of the copolymeric monomers may be used in combination. Among these copolymeric monomers, $\alpha$-$C_{3-8}$ olefin, such as propylene, 1-butene, 1-hexene, 4-methylpentene, and 1-octene, is preferred. The proportion of the copolymeric monomers is 30 mol % or less (for example, 0.01 to 30 mol %), preferably 20 mol % or less (for example, 0.1 to 20 mol %), and more preferably 10 mol % or less (for example, 1 to 10 mol %) or so, relative to the whole monomer unit. The copolymer may be a random copolymer, a block copolymer, or the like.

Examples of the polyethylene resin include low, medium or high density polyethylene, linear low density polyethylene, ultrahigh molecular weight polyethylene, ethylene-propylene copolymer, ethylene-butene-1 copolymer, ethylene-propylene-butene-1 copolymer, ethylene-(4-methylpentene-1) copolymer, and the like. Each of these polyethylenes may be used alone, or two or more kinds of the polyethylenes may be used in combination. Among the polyethylenes, polyethylene such as medium or high density polyethylene or ultrahigh molecular weight polyethylene is preferred due to its great effect of improving the noise suppression.

The viscosity average molecular weight of the polyethylene resin can be, for example, selected from a range of 10,000 or more. The viscosity average molecular weight is, for example, 100,000 to 9,000,000, preferably 150,000 to 5,000,000, and more preferably 200,000 to 3,000,000 or so. When the molecular weight is too small, the effect of improving the noise suppression may not be sufficient. In the present description and the scope of claims, the viscosity average molecular weight can be measured conforming to ASTM D4020.

The density of the polyethylene resin can be selected from a range of about 0.9 to 0.97 $g/cm^3$ in a method conforming to ASTM D792. In order to enhance the effect of improving the noise suppression, the density is, for example, 0.92 to 0.97 $g/cm^3$, preferably 0.93 to 0.97 $g/cm^3$, and more preferably 0.94 to 0.97 $g/cm^3$ or so.

In order to enhance the effect of improving the noise suppression, it is preferable that the melting point (or softening point) of the polyethylene resin is not lower than a temperature of processing such as kneading or rolling for the rubber composition, and not higher than a vulcanizing temperature of the rubber composition. The melting point (or softening point) is, for example, 160° C. or lower (for example, 120° C. to 160° C.), preferably 125° C. to 150° C., and more preferably 125° C. to 140° C. or so.

The aforementioned shapes shown in the above inorganic particles, or the like, may be used as the shape of the polyethylene resin particles. Among the aforementioned shapes, particle shapes such as a spherical shape, an ellipsoidal shape, a polyhedral shape, and an indeterminate shape are generally used as the shape of the polyethylene resin particles.

The average particle size (average primary particle size) of the polyethylene resin particles is, for example, 10 to 200 μm, preferably 20 to 150 μm, and more preferably 25 to 120 μm or so. When the particle size of the polyethylene resin particles is too small, the noise suppression may not be improved sufficiently. On the contrary, when the size is too large, the mechanical characteristics of the belt may deteriorate.

The proportion of the polyethylene resin particles is, for example, 1 to 30 parts by mass (for example, 3 to 25 parts by mass), preferably 5 to 25 parts by mass (for example, 10 to 15 parts by mass), and more preferably 15 to 25 parts by mass (particularly 17 to 23 parts by mass) or so, relative to 100 parts by mass of the rubber component. When the proportion of the polyethylene resin particles is too low, the noise suppression may be lowered. On the contrary, when the proportion is too high, the torque loss may increase.

Among these noise suppression improvers, the surfactant and the plasticizer are preferred in terms of easily improving the noise suppression relative to stick-slip abnormal noise. In particular, when noise suppression relative to stick-slip abnormal noise in a real vehicle is important, it is preferable to contain the surfactant (particularly, a polyethylene glycol nonionic surfactant). When noise suppression relative to stick-slip abnormal noise in a misalignment state is important, it is preferable to contain the plasticizer (particularly, an ether ester plasticizer). Among them, it is particularly preferable to contain a surfactant (particularly, a polyethylene glycol nonionic surfactant) in terms of further excellent balance between the noise suppression and the fuel economy.

(Reinforcing Agent)

The rubber composition forming the compression rubber layer may further contain a reinforcing agent in addition to the rubber component and the noise suppression improver. The reinforcing agent include reinforcing fibers, carbon black as a reinforcing filler, or the like.

Examples of the reinforcing fibers include synthetic fibers such as polyolefin fibers (such as polyethylene fibers and polypropylene fibers), polyamide fibers (such as polyamide 6 fibers, polyamide 66 fibers, polyamide 46 fibers, and aramid fibers), polyester fibers [$C_{2-4}$ alkylene $C_{6-14}$ arylate fibers such as polyethylene terephthalate (PET) fibers and polyethylene naphthalate (PEN) fibers, etc.], vinylon fibers, and polypara-phenylenebenzobisoxazole (PBO) fibers; natural fibers such as cotton, hemp, and wool; inorganic fibers such as carbon fibers; and the like. Each of these fibers may be used alone, or two or more kinds of the fibers may be used in combination.

Among these reinforcing fibers, at least one kind selected from polyamide fibers such as polyamide 66 fibers and aramid fibers, polyester fibers, and vinylon fibers are preferred. The reinforcing fibers may be fibrillated. Further, various bonding treatments may be also performed on the reinforcing fibers in the same manner as the cord.

The reinforcing fibers generally having a form of short fiber may be contained in the compression rubber layer. The average length of the short fiber may be, for example, 0.1 to 20 mm, preferably 0.5 to 15 mm (for example, 1 to 10 mm), and more preferably 1.5 to 5 mm (particularly 2 to 4 mm) or so. The short fiber is oriented in the width direction of the belt in the compression rubber layer, which largely receives lateral pressure and frictional force from the pulley, so that lateral pressure resistance can be secured in the V-ribbed belt. The average fiber diameter of the reinforcing fibers is, for example, 1 to 100 μm, preferably 3 to 50 μm, and more preferably 5 to 40 μm (particularly 10 to 30 μm) or so.

It is preferable that the carbon black contains carbon black having a large particle size, particularly large-particle-size carbon black having an iodine adsorbing amount of 40 mg/g or less in order to suppress internal heat generation in the rubber composition forming the compression rubber layer to improve the fuel economy. Examples of the large-particle-size carbon black include FEF, GPF, APF, SRF-LM, SRF-HM, and the like. Each of these carbon blacks may be used alone, or two or more kinds of the carbon blacks may be used in combination. The number average primary particle size of the large-particle-size carbon black may be, for example, 40 to 200 nm, preferably 45 to 150 nm, and more preferably 50 to 125 nm or so. The number average primary particle size may be generally 40 to 100 nm (for example, 40 to 80 nm), and preferably 40 to 60 nm (for example, 40 to 50 nm) or so.

The reinforcing effect of the large-particle-size carbon black is low. Therefore, it is preferable to use small-particle-size carbon black (having iodine adsorbing amount of higher than 40 mg/g), which is small in particle size and high in the reinforcing effect, together with the large-particle-size carbon black. When at least two kinds of carbon blacks different in particle size are used, it is possible to achieve both the fuel economy and the reinforcing effect. Examples of the small-particle-size carbon black include SAF, ISAF-HM, ISAF-LM, HAF-LS, HAF, HAF-HS, and the like. Each of these carbon blacks may be used alone, or two or more kinds of the carbon blacks may be used in combination. The number average primary particle size of the small-particle-size carbon black may be less than 40 nm, for example, 5 to 38 nm, preferably 10 to 35 nm (for example, 15 to 33 nm), and more preferably 20 to 30 nm (for example, 25 to 30 nm) or so.

The ratio of the average particle size of the large-particle-size carbon black to the average particle size of the small-particle-size carbon black may be 1.5/1 to 3/1, preferably 1.7/1 to 2.7/1, and more preferably 1.8/1 to 2.5/1 or so. The ratio may be generally 1.5/1 to 2/1 (for example, 1.5/1 to 1.8/1), and preferably 1.5/1 to 1.7/1 (for example, 1.5/1 to 1.6/1) or so.

The mass ratio of the large-particle-size carbon black to the small-particle-size carbon black may be within a range where both the fuel economy and the reinforcing effect can be achieved, for example, 20/80 to 55/45, preferably 25/75 to 50/50, and more preferably 30/70 to 50/50 (for example, 40/60 to 50/50) or so. When the proportion of the small-particle-size carbon black is too high in the carbon black as a whole, the fuel economy may deteriorate. When the ratio of the large-particle-size carbon black is too high, the reinforcing effect may deteriorate.

The proportion of the reinforcing agent may be 40 parts by mass or more, for example, 50 to 200 parts by mass, preferably 60 to 180 parts by mass, and more preferably 80 to 150 parts by mass (particularly 100 to 120 parts by mass) or so, relative to 100 parts by mass of the rubber component. According to the present invention, the torque loss can be reduced even when the proportion of the reinforcing agent is high.

The proportion of the reinforcing fibers may be 80 parts by mass or less (for example, 0 to 80 parts by mass), for example, 60 parts by mass or less (for example, 1 to 60 parts by mass), preferably 50 parts by mass or less (for example, 5 to 50 parts by mass), and more preferably 40 parts by mass or less (for example, 10 to 40 parts by mass) or so, relative to 100 parts by mass of the rubber component. The proportion of the reinforcing fibers is generally 20 to 40 parts by mass (for example, 25 to 35 parts by mass) or so. When the proportion of the reinforcing fibers is too high, the torque loss may not be reduced.

The proportion of the carbon black may be 10 parts by mass or more, for example, 20 to 180 parts by mass, preferably 30 to 150 parts by mass, more preferably 50 to 120 parts by mass (for example, 60 to 100 parts by mass), and particularly more preferably 65 to 90 parts by mass (for example, 70 to 80 parts by mass) or so, relative to 100 parts by mass of the rubber component.

(Another Plasticizer)

The rubber composition forming the compression rubber layer may further contain another plasticizer (or softener) having a solubility parameter that is not higher than the solubility parameter of the rubber component, in addition to the rubber component and the noise suppression improver. When the rubber component is an ethylene-α-olefin elastomer, the other plasticizer may be a plasticizer having a solubility parameter of, for example, 6.0 to 8.1 $(cal/cm^3)^{1/2}$, preferably 6.5 to 8.0 $(cal/cm^3)^{1/2}$, and more preferably 7.0 to 7.8 $(cal/cm^3)^{1/2}$ or so. Examples of the other plasticizer include oils such as paraffin oil, naphthene-based oil, process oil, and the like.

The proportion of the other plasticizer (or softener) may be 30 parts by mass or less, for example, 1 to 30 parts by mass, preferably 2 to 25 parts by mass (for example, 3 to 20 parts by mass), more preferably 3.5 to 15 parts by mass (for example, 4 to 10 parts by mass), and particularly more preferably 5 to 8 parts by mass (for example, 6 to 8 parts by mass) or so, relative to 100 parts by mass of the rubber component.

(Vulcanizer and Co-Cross-Linking Agent)

The rubber composition forming the compression rubber layer may further contain a vulcanizer in addition to the rubber component and the noise suppression improver.

Common components can be used as the vulcanizer (or cross-linking agent) in accordance with the kind of the rubber component. Examples of the common components include organic peroxides (such as diacyl peroxide, peroxy ester, and dialkyl peroxide), oximes (such as quinone dioxime), guanidines (such as diphenylguanidine), metal oxides (such as magnesium oxide and zinc oxide), sulfur-based vulcanizers, and the like. Each of these vulcanizers may be used alone, or two or more kinds of the vulcanizers may be used in combination. When the rubber component is an ethylene-α-olefin elastomer, organic peroxides, sulfur-based vulcanizers, and the like are generally used as the vulcanizer.

The proportion of the vulcanizer can be selected within a range of about 1 to 20 parts by mass relative to the 100 parts by mass of the rubber component in accordance with the kind of the vulcanizer and the kind of the rubber component. For example, the proportion of organic peroxide as the vulcanizer is 1 to 8 parts by mass, preferably 1.5 to 5 parts by mass, and more preferably 2 to 4.5 parts by mass or so, relative to 100 parts by mass of the rubber component. The proportion may be generally 3 to 7 parts by mass or so.

The rubber composition forming the compression rubber layer may further contain a co-cross-inking agent such as bismaleimides (e.g., arene bismaleimides such as N,N'-m-phenylenedimaleimide, or aromatic bismaleimides).

The proportion of the co-cross-linking agent can be selected from a range of about 0.01 to 10 parts by mass relative to 100 parts by mass of the rubber component. For example, the proportion is 0.1 to 10 parts by mass, preferably 0.5 to 6 parts by mass, and more preferably 1 to 5 parts by mass (for example, 1 to 3 parts by mass) or so.

(Other Additives)

The rubber composition forming the compression rubber layer may contain a common additive as a further another additive in addition to the rubber component and the noise suppression improver.

Examples of the common additive include a vulcanization accelerator, a vulcanization retardant, a processing agent or a processing aid (such as stearic acid, metal stearate, wax, paraffin, and aliphatic acid amide), a stabilizer or an anti-aging agent (such as an ultraviolet absorber, an antioxidant, an anti-thermal aging agent or a thermal stabilizer, a flex cracking inhibitor, and an antiozonant), a colorant, an adhesion improver [resorcin-formaldehyde co-condensate, melamine resin such as hexamethoxymethylmelamine, co-condensate of those (such as resorcin-melamine-formaldehyde co-condensate), etc.], a tackifier, a coupling agent (such as a silane coupling agent), a lubricant, a flame retardant, an antistatic agent, and the like. Each of these additives may be used alone, or two or more kinds of the additives may be used in combination.

The proportions of the other additives can be selected from their common ranges in accordance with the kinds thereof. For example, each proportion may be about 0.1 to 5 parts by mass (particularly 0.5 to 3 parts by mass) relative to 100 parts by mass of the rubber component.

[Method for Manufacturing V-Ribbed Belt]

A method for manufacturing the V-ribbed belt according to the present invention is not limited particularly, but a well-known or common method can be used. For example, the V-ribbed belt can be formed in the following manner A compression rubber layer, an adhesive layer in which a tension member is embedded, and a tension layer are formed from unvulcanized rubber compositions respectively, and stacked on one another. A thus-formed laminate is formed into a cylindrical shape by a shaping mold, and vulcanized to form a sleeve. The vulcanized sleeve is cut into a predetermined width, and thus the V-ribbed belt is formed. More in detail, the V-ribbed belt can be manufactured in the following method.

(First Manufacturing Method)

First, a sheet for a tension layer is wound on a cylindrical shaping mold having a smooth surface. A cord (twisted cord) for forming a tension member is spun spirally on the sheet. Further, a sheet for an adhesive layer and a sheet for a compression rubber layer are wound sequentially to produce a molded body. After that, a vulcanizing jacket is put on the molded body, and the mold (i.e., shaping mold) is received in a vulcanizing can. After vulcanized under predetermined vulcanization conditions, the molded body is released from the shaping mold to obtain a cylindrical vulcanized rubber sleeve. The external surface (i.e., compression rubber layer) of the vulcanized rubber sleeve is ground by a grinding wheel to form a plurality of ribs. The vulcanized rubber sleeve is then cut with a cutter into a predetermined width in a belt longitudinal direction to be finished into a V-ribbed belt. When the cut belt is reversed, a V-ribbed belt provided with a compression rubber layer having rib portions in its inner circumferential surface can be obtained.

(Second Manufacturing Method)

First, a cylindrical inner mold mounted with a flexible jacket in its outer circumferential surface is used as an inner mold, and an unvulcanized sheet for a tension layer is wound on the flexible jacket in the outer circumferential surface. A cord for forming a tension member is spun spirally on the sheet. Further, an unvulcanized sheet for a compression rubber layer is wound to produce a laminate. Next, a cylindrical outer mold in which a plurality of rib molds have been craved in its inner circumferential surface is used as an outer mold which can be attached to the inner mold. The inner mold on which the laminate is wound is placed in the outer mold coaxially. After that, the flexible jacket is expanded toward the inner circumferential surface (i.e., rib molds) of the outer mold to press the laminate (compression rubber layer) into the rib molds. The laminate is vulcanized. The inner mold is then extracted from the outer mold, and a vulcanized rubber sleeve having a plurality of ribs is released from the outer mold. After that, the vulcanized rubber sleeve is cut with a cutter into a predetermined width in a belt longitudinal direction to be finished into a V-ribbed belt. In the second manufacturing method, the laminate having the tension layer, the tension member and the compression rubber layer can be expanded at a time to be finished into a sleeve (or a V-ribbed belt) having a plurality of ribs.

(Third Manufacturing Method)

With respect to the second manufacturing method, for example, a method disclosed in JP-A-2004-82702 (i.e., a method in which only the compression rubber layer is expanded to form a preformed body (which is semi-vulcanized), and next the tension layer and the tension member are expanded to be crimped to the preformed body, and vulcanized to be integrated and finished into a V-ribbed belt) may be used.

EXAMPLES

The present invention is described below in detail based on examples. However, the present invention is not limited by the examples. In the following examples, raw materials used in the examples, measuring methods and evaluation methods for respective physical properties is shown below. Unless otherwise specifically noted, "parts" and "%" will be expressed on a mass basis.

[Raw Materials]

EPDM: "EPT2060M" manufactured by Mitsui Chemicals, Inc.

Nylon short fiber: 66 nylon, average fiber diameter 27 μm, average fiber length 3 mm Cotton short fiber: denim, average fiber diameter 13 μm, average fiber length 6 mm Zinc oxide: "Three Kinds of Zinc Oxides" manufactured by Seido Chemical Industry Co., Ltd.

Stearic acid: "STEARIC ACID CAMELLIA" manufactured by NOF Corporation

Carbon black HAF: "SEAST 3" manufactured by Tokai Carbon Co., Ltd., average particle size 28 nm Carbon black FEF: "SEAST SO" manufactured by Tokai Carbon Co., Ltd., average particle size 43 nm Hydrated silica: "Nipsil VN3" manufactured by Tosoh Silica Corporation Paraffin oil (softener): "Diana Process Oil PW-90" manufactured by Idemitsu Kosan Co., Ltd.

Surfactant: polyoxyalkylene alkyl ether, "Newcol 2304-Y" manufactured by Nippon Nyukazai Co., Ltd.

Ether ester plasticizer: "RS-700" manufactured by ADEKA Corporation Calcium carbonate: "Whiton SSB" manufactured by Shiraishi Calcium Kaisha Ltd.

Clay (kaolinite): "HARD TOP CLAY" manufactured by Shiraishi Calcium Kaisha Ltd.

Clay (montmorillonite): "BEN-GEL A" manufactured by HOJUN Co., Ltd.

Talc: "RL217" manufactured by Fuji Talc Industrial Co., Ltd., median diameter 20 μm Polyethylene particles: "HI-ZEX MILLION 240S" manufactured by Mitsui Chemicals, Inc.

Resorcin-formalin copolymer (resorcinol resin): Resorcinol-formalin copolymer containing less than 20% of resorcinol and less than 0.1% of formalin Anti-aging agent: "NONFLEX OD3" manufactured by Seiko Chemical Co., Ltd.

Organic peroxides: "PERCUMYL D-40" manufactured by NOF Corporation

Vulcanization accelerator A: Tetramethylthiuram disulfide (TMTD)

Vulcanization accelerator B: N-cyclohexyl-2-benzothiazyl-sulfenamide (CBS)

Co-cross-linking agent A: p,p'-dibenzylquinone dioxime, "VULNOC DGM" manufactured by Ouchi Shinko Chemical Industrial Co., Ltd.

Co-cross-linking agent B: N,N'-m-phenylenedimaleimide, "VULNOC PM" manufactured by Ouchi Shinko Chemical Industrial Co., Ltd.

Cord: Twisted cord prepared by twisting 1,000-denier PET fiber in a twist configuration of 2×3 with an final twisting coefficient of 3.0 and a primary twisting coefficient of 3.0, and subjecting the obtained cord having a total denier of 6,000 to a bonding treatment; cord diameter of 1.0 mm.

Examples 1 to 22 and Comparative Examples 1 to 18

(Manufacturing V-Ribbed Belt)

A rubber composition for forming a tension layer, a rubber composition for forming a compression rubber layer and a rubber composition for forming an adhesive layer shown in Tables 1 and 2 were kneaded using a well-known method such as a Banbury mixer. The kneaded rubber was passed through calender rolls to produce a tension layer forming sheet, a compression rubber layer forming sheet and an adhesive layer forming sheet with predetermined thicknesses.

TABLE 1

(rubber compositions for tension layer and adhesive layer)

| | Material | Tension layer | Adhesive layer |
|---|---|---|---|
| Composition (parts by mass) | EPDM | 100 | 100 |
| | Nylon short fiber | 15 | 0 |
| | Cotton short fiber | 20 | 0 |
| | Zinc oxide | 5 | 5 |
| | Stearic acid | 1 | 1 |
| | Carbon black HAF | 50 | 40 |
| | Hydrated silica | 0 | 20 |
| | Paraffin oil | 10 | 8 |
| | Resorcin-formalin copolymer | 0 | 2 |
| | Anti-aging agent | 2 | 2 |
| | Organic peroxide | 5 | 0 |
| | Sulfur | 0 | 1 |
| | Vulcanization accelerator A | 0 | 1 |
| | Vulcanization accelerator B | 0 | 1 |
| | Hexamethoxymethylolmelamine | 0 | 4 |
| | Co-cross-linking agent A | 2 | 0 |

TABLE 2

(composition for compression rubber layer)

| | Composition No. (parts by mass) | | | | | | | | | | | | | | | | |
|---|---|---|---|---|---|---|---|---|---|---|---|---|---|---|---|---|---|
| | A | B | C | D | E | F | G | H | I | J | K | L | M | N | O | P | Q |
| EPDM | 100 | 100 | 100 | 100 | 100 | 100 | 100 | 100 | 100 | 100 | 100 | 100 | 100 | 100 | 100 | 100 | 100 |
| Nylon short fiber | 30 | 30 | 30 | 30 | 30 | 30 | 30 | 30 | 30 | 30 | 30 | 30 | 30 | 30 | 30 | 30 | 30 |
| Carbon black HAF | 40 | 40 | 40 | 40 | 40 | 40 | 40 | 40 | 40 | 40 | 40 | 40 | 40 | 40 | 40 | 40 | 40 |
| Carbon black FEF | 35 | 35 | 35 | 35 | 35 | 35 | 30 | 20 | 25 | 20 | 25 | 20 | 25 | 20 | 25 | 20 | 35 |
| Paraffin oil | 18 | 7 | — | 10 | 5 | — | 10 | 10 | 10 | 10 | 10 | 10 | 10 | 10 | 10 | 10 | 20 |
| Surfactant | 2 | 5 | 20 | — | — | — | — | — | — | — | — | — | — | — | — | — | — |
| Ether ester plasticizer | — | — | — | 5 | 10 | 15 | — | — | — | — | — | — | — | — | — | — | — |
| Calcium carbonate | — | — | — | — | — | — | 15 | 30 | — | — | — | — | — | — | — | — | — |
| Clay (kaolinite) | — | — | — | — | — | — | — | — | 20 | 35 | — | — | — | — | — | — | — |
| Clay (montmorillonite) | — | — | — | — | — | — | — | — | — | — | 20 | 35 | — | — | — | — | — |
| Talc | — | — | — | — | — | — | — | — | — | — | — | — | 20 | 35 | — | — | — |
| Polyethylene particles | — | — | — | — | — | — | — | — | — | — | — | — | — | — | 5 | 20 | — |
| Organic peroxide | 5 | 5 | 5 | 5 | 5 | 5 | 5 | 5 | 5 | 5 | 5 | 5 | 5 | 5 | 5 | 5 | 5 |
| Co-cross-linking agent B | 2 | 2 | 2 | 2 | 2 | 2 | 2 | 2 | 2 | 2 | 2 | 2 | 2 | 2 | 2 | 2 | 2 |

Next, a V-ribbed belt was produced using the following well-known method. First, a sheet for a tension layer was wound on a cylindrical shaping mold having a smooth surface. A cord (twisted cord) for forming a tension member was spun spirally on the sheet for the tension layer. A sheet for an adhesive layer and a sheet for a compression rubber layer were wound sequentially to form a molded body. After that, a vulcanizing jacket was put on the molded body. In this state, the shaping mold was placed in a vulcanizing can. After vulcanized on conditions at a temperature of 160° C. and for 30 minutes, the molded body was released from the shaping mold to obtain a cylindrical vulcanized rubber sleeve. The external surface (i.e., compression rubber layer) of the vulcanized rubber sleeve was ground by a grinding wheel to form a plurality of ribs at predetermined intervals. The vulcanized rubber sleeve was then cut with a cutter into a predetermined width in a belt longitudinal direction to be finished into a V-ribbed belt.

(Dimensions of V-Ribbed Belt)

Figure 4:
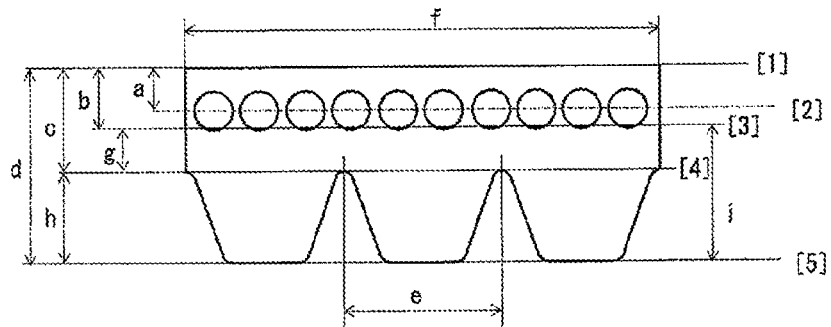
FIG. 4 is a schematic sectional view for illustrating dimensions of a V-ribbed belt used in each Example.

The obtained V-ribbed belt was adjusted as shown in FIG. 4 and Table 3, so that a distance a from a cord center [2] to a V-ribbed belt back face [1] was 1.00 mm, a distance b from a cord bottom portion [3] to the V-ribbed belt back face [1] was 1.50 mm, a distance c from a rib bottom portion [4] to the V-ribbed belt back face [1] was 2.30 mm, a distance d from a rib top end [5] to the V-ribbed belt back face [1] was 4.30 mm, a rib pitch e was 3.56 mm, a distance g from the cord bottom portion [3] to the rib bottom portion [4] was 0.80 mm, a distance h from the rib top end [5] to the rib bottom portion [4] was 2.00 mm, and a distance i from the rib top end [5] to the cord bottom portion [3] was 2.80 mm.

The curvature radius Rb of the rib bottom portion of the V-ribbed belt was adjusted to the values shown in Tables 4 to 6, and the V-rib angle α of the V-rib portion was adjusted to 40°.

The curvature radius Rp at the rib top end of all the pulleys (all the pulleys in FIG. 5 to FIG. 8) used in the measurement described below were values shown in Tables 4 to 6, and the V-rib groove angle β of all the pulleys was 40°.

TABLE 3

| V-ribbed belt dimensions (mm) | |
|---|---|
| a | 1.00 |
| b | 1.50 |
| c | 2.30 |
| d: Total thickness | 4.30 |
| e: Rib width | 3.56 |
| f: Belt width | (e) × (number of ribs) |
| h | 0.80 |
| i: Rib height | 2.00 |
| j | 2.80 |

[Measuring Friction Loss (Torque Loss)]

Figure 5:
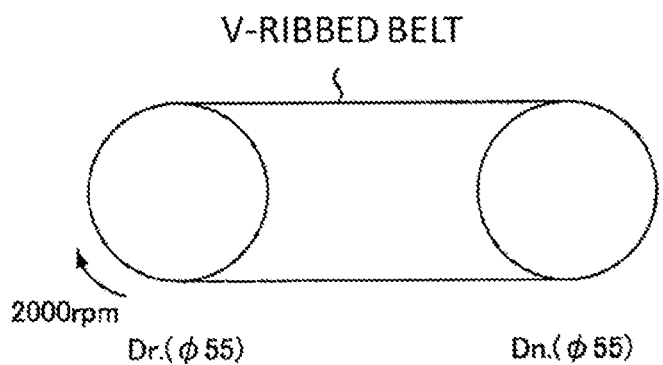
FIG. 5 is a schematic view for illustrating a method of measuring friction loss of a V-ribbed belt in each Example.

As shown in FIG. 5, a V-ribbed belt (having four ribs, and 750 mm long) was wound on a biaxial running testing machine constituted by a driving (Dr) pulley having a diameter of 55 mm and a driven (Dn) pulley having a diameter of 55 mm Predetermined initial tension was applied to the V-ribbed belt within a tension range of 100 to 600 N per belt, and the driving pulley was rotated at 2,000 rpm with no load on the driven pulley. A difference between driving torque and driven torque at that time was calculated as torque loss. The obtained results are shown in Tables 4 to 6. Tables show torque loss obtained when initial tension of 500 N was applied.

The torque loss obtained by this measurement includes not only torque loss caused by bending loss of the V-ribbed belt but also torque loss caused by a bearing of the testing machine. Therefore, a metal belt (made of maraging steel), in which torque loss as a V-ribbed belt was estimated to be substantially zero, was set to run in advance. A difference between driving torque and driven torque at that time was regarded as torque loss caused by the bearing (i.e., bearing loss). Thus, a value obtained by subtracting the torque loss caused by the bearing from the torque loss calculated by the running of the V-ribbed belt (i.e., torque loss caused by both the V-ribbed belt and the bearing) was obtained as torque loss caused by the V-ribbed belt alone. Here, the torque loss (i.e., bearing loss) to be subtracted is a torque loss obtained from the metal belt running with predetermined initial tension (for example, torque loss obtained from the metal belt running with the same initial tension as the initial tension of 500 N per belt applied to the V-ribbed belt which is running) As the torque loss of the V-ribbed belt obtained thus is smaller, the fuel economy is more excellent. From the viewpoint of fuel economy in an automobile engine, it is preferable that the torque loss is reduced to 0.25 Nm or less.

[Noise Suppression Test (Measuring Sounding in Real Vehicle)]

Figure 6:
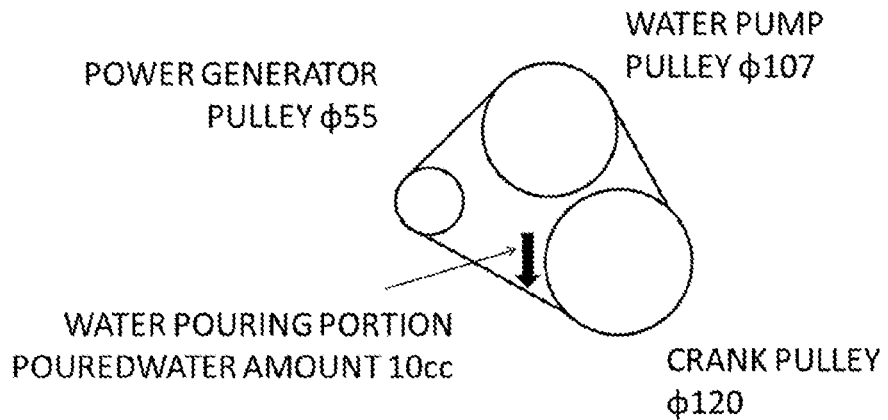
FIG. 6 is a schematic view for illustrating a noise suppression test (here, measuring sound in a real vehicle) of the V-ribbed belt in each Example.

Using an engine of a real vehicle, a V-ribbed belt was wound on a water pump pulley (diameter 107 mm), a crank pulley (diameter 120 mm) and a power generator pulley (diameter 55 mm) in the layout shown in FIG. 6. On conditions that belt tension was 300 N per belt, a load on the power generator was 70 A, and the crank rotational frequency was idling, occurrence of stick-slip abnormal noise in the V-ribbed belt (having four ribs, and 750 mm long) wetted by water poured thereto was checked, and evaluated in the following criteria. Results are shown in Tables 4 to 6.

A: no abnormal noise
B: very small abnormal noise within 3 seconds (practically unproblematic level)
C: small abnormal noise within 3 seconds (the noise is audible in an engine room, but not audible within the interior of the vehicle. It is no good if high-level silence is requested, but normally in unproblematic level.)
D: abnormal noise generated continuously for three or more seconds

[Noise Suppression Test (Measuring Misalignment Sounding)]

Figure 7:
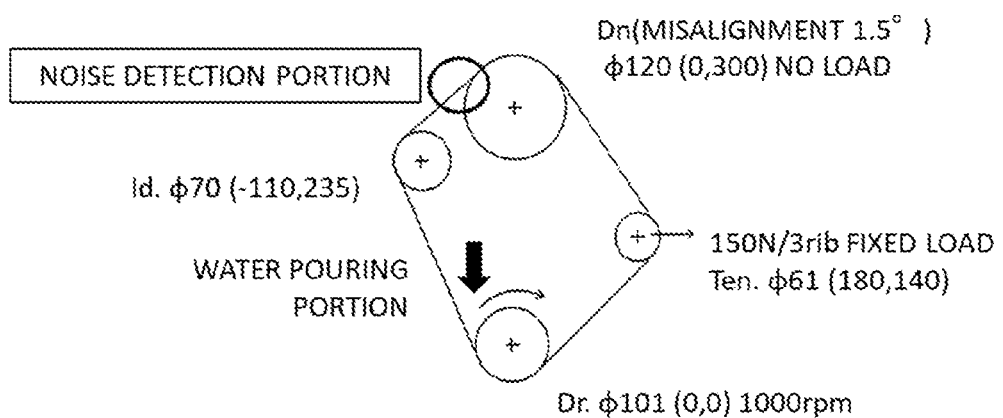
FIG. 7 is a schematic view for illustrating a noise suppression test (measuring misalignment sound) of the V-ribbed belt in each Example.

The noise suppression was also evaluated by a misalignment sounding test. As shown in FIG. 7, a testing machine used for the evaluation had a configuration in which a driving (Dr) pulley (diameter 101 mm), an idler (Id) pulley (diameter 70 mm), a driven (Dn) pulley (diameter 120 mm), and a tension (Ten) pulley (diameter 61 mm) were disposed, and misalignment was set at an angle of 1.5° between the driving pulley and the driven pulley. A V-ribbed belt (having six ribs, and 1,200 mm long) was wound on the pulleys in the testing machine. On conditions at 25° C., the V-ribbed belt was set to run with the driving pulley driving at a rotational frequency of 1,000 rpm. A load was applied to the driving pulley so that the belt tension at that time reached 50 N per rib. Occurrence of stick-slip abnormal noise (abnormal noise heard squeaky) generated when water was poured to the belt at 100 ml/min for one minute was checked, and evaluated in the same criteria as in the measurement of sounding in the real vehicle. Results are shown in Tables 4 to 6.

[Sticking Wear Test of Rib Bottom Portion]

Figure 8:
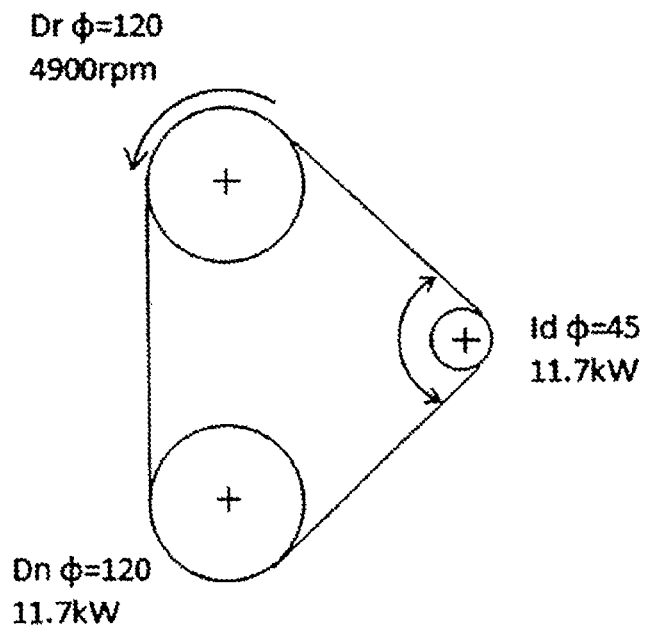
FIG. 8 is a schematic view illustrating a sticking wear test for a rib bottom portion of the V-ribbed belt in each Example.

A sticking wear test was performed using a testing machine in which a driving (Dr) pulley (diameter 120 mm), an idler (Id) pulley (diameter 45 mm), and a driven (Dn) pulley (diameter 120 mm) were disposed sequentially as in the layout shown in FIG. 8. In detail, a V-ribbed belt (having four ribs, and 1,200 mm long) was wound on the respective pulleys in the testing machine, and the belt was set to run at an atmospheric temperature of 25° C. for 5 hours with belt initial tension (940 N per four ribs) under the conditions that the rotational frequency of the driving pulley was 4,900 rpm, and a load on the idler pulley and the driven pulley was set at 11.7 kW. Occurrence of sticking wear (abnormal noise heard stickily due to sticking) at the bottom portion of each V-rib portion (rib bottom portion) after the running was evaluated in the following criteria. Results are shown in Tables 4 to 6.

A: no sticking wear
B: very small sticking wear, but unproblematic level on running performance
D: sticking wear in problematic level against running

TABLE 4

| | Examples | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| Composition No. of compression rubber layer | A | B | C | D | E | F | G | H | I | J | K | L | M | N | O | P |
| V-ribbed belt Rb (mm) | | | | | | | | 0.35 | | | | | | | | |
| V-ribbed pulley Rp (mm) | | | | | | | | 0.35 | | | | | | | | |
| Rp − Rb (mm) | | | | | | | | 0 | | | | | | | | |
| Torque loss (N · m) at tension of 500N | 0.21 | 0.21 | 0.22 | 0.21 | 0.23 | 0.24 | 0.23 | 0.23 | 0.22 | 0.24 | 0.23 | 0.23 | 0.24 | 0.25 | 0.24 | 0.23 |
| Noise suppression (real vehicle test) | B | A | A | A | A | A | C | C | C | B | C | B | C | B | C | C |
| Noise suppression (misalignment test) | A | A | A | B | A | A | C | B | C | C | C | B | C | B | C | B |
| Sticking wear in rib bottom | A | A | A | A | A | A | A | A | A | A | A | A | A | A | A | A |

TABLE 5

| | Examples | | | | | |
|---|---|---|---|---|---|---|
| | 17 | 18 | 19 | 20 | 21 | 22 |
| Composition No. of compression rubber layer | B | | E | | H | |
| V-ribbed belt Rb (mm) | 0.30 | 0.40 | 0.30 | 0.40 | 0.30 | 0.40 |
| V-ribbed pulley Rp (mm) | | | 0.35 | | | |
| Rp − Rb (mm) | 0.05 | −0.05 | 0.05 | −0.05 | 0.05 | −0.05 |
| Torque loss (N · m) at tension of 500N | 0.23 | 0.20 | 0.24 | 0.21 | 0.22 | 0.21 |
| Noise suppression (real vehicle test) | A | A | A | A | B | B |
| Noise suppression (misalignment test) | A | A | A | A | B | B |
| Sticking wear in rib bottom | A | B | A | B | A | B |

TABLE 6

| | Comparative Examples | | | | | | | | | | | | | | | | | |
|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 |
| Composition No. of compression rubber layer | | Q | | A | | B | | D | | E | | G | I | K | M | O | B | E |
| V-ribbed belt Rb (mm) | 0.20 | 0.25 | 0.35 | 0.20 | 0.25 | 0.20 | 0.25 | 0.20 | 0.25 | 0.20 | 0.25 | | | 0.20 | | | 0.45 | |
| V-ribbed pulley Rp (mm) | | | | | | | | | 0.35 | | | | | | | | | |
| Rp − Rb (mm) | 0.15 | 0.10 | 0 | 0.15 | 0.10 | 0.15 | 0.10 | 0.15 | 0.10 | 0.15 | 0.10 | | | 0.15 | | | −0.10 | |
| Torque loss (N·m) at tension of 500N | 0.25 | 0.23 | 0.20 | 0.33 | 0.31 | 0.33 | 0.30 | 0.34 | 0.32 | 0.34 | 0.30 | 0.31 | 0.30 | 0.30 | 0.31 | 0.30 | 0.21 | 0.21 |
| Noise suppression (real vehicle test) | D | D | D | A | A | A | A | A | A | A | A | C | C | C | C | C | A | A |
| Noise suppression (misalignment test) | D | C | C | A | A | A | A | A | A | A | A | C | C | C | C | B | A | A |
| Sticking wear in rib bottom | A | A | A | A | A | A | A | A | A | A | A | A | A | A | A | A | D | D |

As is apparent from the results in Tables 4 to 6, in Comparative Examples 4 to 16 in which rubber compositions (A to P) high in internal loss (i.e., tan δ) (or to which a noise suppression improver was added) were used, and the difference Rp−Rb of curvature radii was larger than 0.05 min (or Rb−Rp was smaller than −0.05 mm), the value of torque loss increased to be 0.30 to 0.34 N·m.

In contrast, in Examples 1 to 22 in which the difference Rp−Rb (or Rb−Rp) of curvature radii was within a range of −0.05 to 0.05 mm even when the rubber compositions (A to P) high in internal loss (i.e., tan δ) were used, the value of torque loss decreased to be 0.20 to 0.25 N·m despite the addition of a noise suppression improver.

The difference between the level where the torque loss is "0.30 to 0.34 N·m" and the level where the torque loss is "0.20 to 0.25 N·m", that is, reduction of "0.05 to 0.14 N·m" in torque loss is, for example, a significant difference corresponding to improvement of 0.2% in fuel consumption of a light car (improvement of 0.1% in fuel consumption is a large effect in the automobile field).

In Comparative Examples 1 to 3, a rubber composition (Q) low in internal loss (i.e., tan δ) (or to which a noise suppression improver was not added), so that the torque loss was reduced regardless of the difference Rp−Rb (or Rb−Rp) of curvature radii.

In Comparative Examples 17 to 18 in which the curvature radius Rb was larger than the curvature radius Rp, and the difference between Rb and Rp was as large as 0.10 mm, torque loss was small. However, the sticking wear of the rib bottom portion occurred in a problematic level against running.

In Examples 1 to 6 and 17 to 20 and Comparative Examples 4 to 11 and 17 to 18 in which rubber compositions blended with a plasticizer or a surfactant were used, the stick-slip abnormal noise did not occur (A or B level). In Examples 7 to 16 and 21 to 22 and Comparative Examples 12 to 16 in which rubber compositions blended with an inorganic filler or polyethylene particles were used, the results were inferior to the case where a plasticizer or a surfactant was blended, but stick-slip abnormal noise slightly occurred (B or C level). In contrast, in Comparative Examples 1 to 3 in which these noise suppression improvers were not used, stick-slip abnormal noise occurred.

From the above results, in a driving apparatus in which each of the V-ribbed belts according to Examples 1 to 22 (especially Example 2) was combined with V-ribbed pulleys, it was confirmed that it is possible to improve the fuel economy (i.e., reduce torque loss) while maintaining the noise suppression (i.e., silence).

Examples 23 to 26

V-ribbed belts were produced in the same manner as in Example 2 except that the curvature radius Rb of a rib bottom portion of a belt was changed as shown in Table 7, and various evaluations were performed in the same manner as in Example 2 except that a curvature radius Rp of a rib top end of all the pulleys used in the test was changed as shown in Table 7 (making the above changes so that Rp−Rb=0 while α=β=40°). The evaluation results were shown in Table 7 together with the evaluation result of Example 2.

TABLE 7

| | Examples | | | | |
|---|---|---|---|---|---|
| | 23 | 24 | 25 | 2 | 26 |
| Composition No. of compression rubber layer | | | B | | |
| V-ribbed belt Rb (mm) | 0.24 | 0.25 | 0.28 | 0.35 | 0.43 |
| V-ribbed pulley Rp (mm) | 0.24 | 0.25 | 0.28 | 0.35 | 0.43 |
| Rp − Rb (mm) | | | 0 | | |
| Torque loss (N · m) at tension of 500N | 0.25 | 0.23 | 0.23 | 0.21 | 0.21 |
| Noise suppression (real vehicle test) | A | A | A | A | A |
| Noise suppression (misalignment test) | A | A | A | A | A |
| Sticking wear in rib bottom | B | B | A | A | A |

As is apparent from Table 7, among Examples in which the difference Rp−Rb of curvature radii was 0, the torque loss tended to be slightly larger, in Examples (Examples 23 to 25, especially Example 23) in which a curvature radius Rb of a rib bottom portion of a belt was small, as compared with Example 2. In Examples 23 and 24, a rib bottom portion of a rib of a belt was likely to be scraped, and very small sticking wear occurred although they were at an unproblematic level on running because a curvature radius Rp of a rib top end of a pulley, which came into contact with a belt, was small, resulting in a sharp shape.

While the present invention has been described in detail and with reference to specific embodiments thereof, it will be apparent to one skilled in the art that various changes and modifications can be made therein without departing from the spirit and scope of the invention.

This application is based on Japanese Patent Application 2018-087204 filed on Apr. 27, 2018 and Japanese Patent Application 2019-079580 filed on Apr. 18, 2019, the contents of which are incorporated herein by reference.

INDUSTRIAL APPLICABILITY

The V-ribbed belt according to the present invention can be used as a V-ribbed belt for various belt transmission systems, particularly a system including a small-diameter pulley such as an alternator serving as a power generator, and is used as, for example, a V-ribbed belt for a driving system of an automobile engine auxiliary machine.

REFERENCE SIGN LIST

1 Tension member
2 Compression rubber layer
3 Rib (rib portion or V-rib portion)
3a Rib bottom portion (rib groove bottom portion)
4 Adhesive layer
5 Tension layer
6 Rib top end of pulley

The invention claimed is:

1. A V-ribbed belt comprising: a plurality of V-rib portions extending along a longitudinal direction of the V-ribbed belt and in parallel with one another; and a compression rubber layer comprising a frictional power transmission face at least a part of which is configured to come into contact with a V-rib groove portion of a pulley,
wherein the frictional power transmission face of the compression rubber layer is formed from a vulcanizate of a rubber composition containing a rubber component and a noise suppression improver, and
a difference between a curvature radius of a rib top end of the pulley and a curvature radius of a rib bottom portion of the V-ribbed belt is −0.08 to 0.08 mm.

2. The V-ribbed belt according to claim 1, wherein the curvature radius of the rib bottom portion of the V-ribbed belt is 0.1 to 0.5 mm.

3. The V-ribbed belt according to claim 1, wherein the difference between the curvature radii is −0.05 to 0.05 mm.

4. The V-ribbed belt according to claim 1, wherein the pulley includes a pulley having an outer diameter of 65 mm or smaller.

5. The V-ribbed belt according to claim 1, wherein each V-rib portion of the V-ribbed belt has a V-rib angle of 30° to 60°, and a difference between the V-rib angle and a V-rib groove angle of the pulley is −1° to 1°.

6. The V-ribbed belt according to claim 1, wherein the noise suppression improver is at least one kind selected from the group consisting of a surfactant, a plasticizer having a larger solubility parameter than the rubber component, inorganic particles, and polyethylene resin particles.

7. The V-ribbed belt according to claim 1, wherein the noise suppression improver contains a polyethylene glycol nonionic surfactant, and a proportion of the polyethylene glycol nonionic surfactant is 2 to 20 parts by mass relative to 100 parts by mass of the rubber component.

8. The V-ribbed belt according to claim 1, wherein the noise suppression improver contains an ether ester plasticizer, and a proportion of the ether ester plasticizer is 5 to parts by mass relative to 100 parts by mass of the rubber component.

9. The V-ribbed belt according to claim 1, wherein the rubber component contains an ethylene-α-olefin elastomer.

10. A belt power-transmission apparatus comprising: the V-ribbed belt according to claim 1; and each pulley having a V-rib groove portion capable of fitting to one of the V-rib portions of the V-ribbed belt, wherein the difference between the curvature radius of the rib top end of the pulley and the curvature radius of the rib bottom portion of the V-ribbed belt is −0.08 to 0.08 mm.

11. The belt power-transmission apparatus according to claim 10, wherein the pulley includes a pulley having an outer diameter of 65 mm or smaller.

12. A method for reducing torque loss of a belt power-transmission apparatus, the method comprising:
hanging a V-ribbed belt on a pulley, the V-ribbed belt comprising:
a plurality of V-rib portions extending along a longitudinal direction of the V-ribbed belt and in parallel with one another; and
a compression rubber layer comprising a frictional power transmission face at least a part of which is configured to come into contact with a V-rib groove portion of the pulley,
wherein the frictional power transmission face of the compression rubber layer is formed from a vulcanizate of a rubber composition containing a rubber component and a noise suppression improver,
a difference between a curvature radius of a rib top end of the pulley and a curvature radius of a rib bottom portion of the V-ribbed belt is −0.08 to 0.08 mm, and
wherein the pulley includes a pulley having an outer diameter of 65 mm or smaller.

* * * * *